(12) United States Patent
Anders et al.

(10) Patent No.: US 10,599,429 B2
(45) Date of Patent: Mar. 24, 2020

(54) VARIABLE FORMAT, VARIABLE SPARSITY MATRIX MULTIPLICATION INSTRUCTION

(71) Applicant: Intel Corporation, Santa Clara, CA (US)

(72) Inventors: Mark A. Anders, Hillsboro, OR (US); Himanshu Kaul, Portland, OR (US); Sanu Mathew, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 16/003,545

(22) Filed: Jun. 8, 2018

(65) Prior Publication Data

US 2019/0042250 A1 Feb. 7, 2019

(51) Int. Cl.
*G06F 9/30* (2018.01)
*G06F 17/16* (2006.01)
*G06N 20/00* (2019.01)
*G06N 3/063* (2006.01)

(52) U.S. Cl.
CPC ........ *G06F 9/30036* (2013.01); *G06F 9/3016* (2013.01); *G06F 17/16* (2013.01); *G06N 3/063* (2013.01); *G06N 20/00* (2019.01)

(58) Field of Classification Search
CPC ....................................................... G06F 9/00
See application file for complete search history.

(56) References Cited

U.S. PATENT DOCUMENTS

| 4,603,398 A | * | 7/1986 | Bocker | .................. G06E 3/005 |
| | | | | 706/40 |
| 4,686,645 A | * | 8/1987 | McCanny | ........... G06F 15/8046 |
| | | | | 708/620 |
| 5,235,537 A | * | 8/1993 | McWhirter | ........... G06F 7/5443 |
| | | | | 708/200 |
| 8,473,540 B1 | * | 6/2013 | Rao | ...................... H04B 7/0854 |
| | | | | 708/201 |

(Continued)

OTHER PUBLICATIONS

Chen et al., "New Systolic Arrays for Matrix Multiplication", Proceedings of the International Conference on Parallel Processing, (ICPP'1994), IEEE, 1994, pp. II-211-II-215.

(Continued)

*Primary Examiner* — Cheng Yuan Tseng
(74) *Attorney, Agent, or Firm* — Nicholson De Vos Webster & Elliott, LLP

(57) ABSTRACT

Disclosed embodiments relate to a variable format, variable sparsity matrix multiplication (VFVSMM) instruction. In one example, a processor includes fetch and decode circuitry to fetch and decode a VFVSMM instruction specifying locations of A, B, and C matrices having (M×K), (K×N), and (M×N) elements, respectively, execution circuitry, responsive to the decoded VFVSMM instruction, to: route each row of the specified A matrix, staggering subsequent rows, into corresponding rows of a (M×N) processing array, and route each column of the specified B matrix, staggering subsequent columns, into corresponding columns of the processing array, wherein each of the processing units is to generate K products of A-matrix elements and matching (Continued)

B-matrix elements having a same row address as a column address of the A-matrix element, and to accumulate each generated product with a corresponding C-matrix element.

25 Claims, 21 Drawing Sheets

(56) References Cited

U.S. PATENT DOCUMENTS

| | | | | |
|---|---|---|---|---|
| 8,620,984 | B2* | 12/2013 | Mazahreh | G06F 17/16 |
| | | | | 708/323 |
| 8,782,115 | B1* | 7/2014 | Dhanoa | H04L 25/0246 |
| | | | | 375/260 |
| 9,206,671 | B2* | 12/2015 | Shetty | E21B 41/00 |
| 9,959,247 | B1* | 5/2018 | Woo | G06F 9/30032 |
| 10,387,122 | B1* | 8/2019 | Olsen | G06F 17/16 |
| 2014/0108481 | A1 | 4/2014 | Davis et al. | |
| 2016/0283240 | A1 | 9/2016 | Mishra et al. | |

OTHER PUBLICATIONS

European Search Report and Search Opinion, EP App. No. 19172622.3, dated Sep. 19, 2019, 9 pages.

* cited by examiner

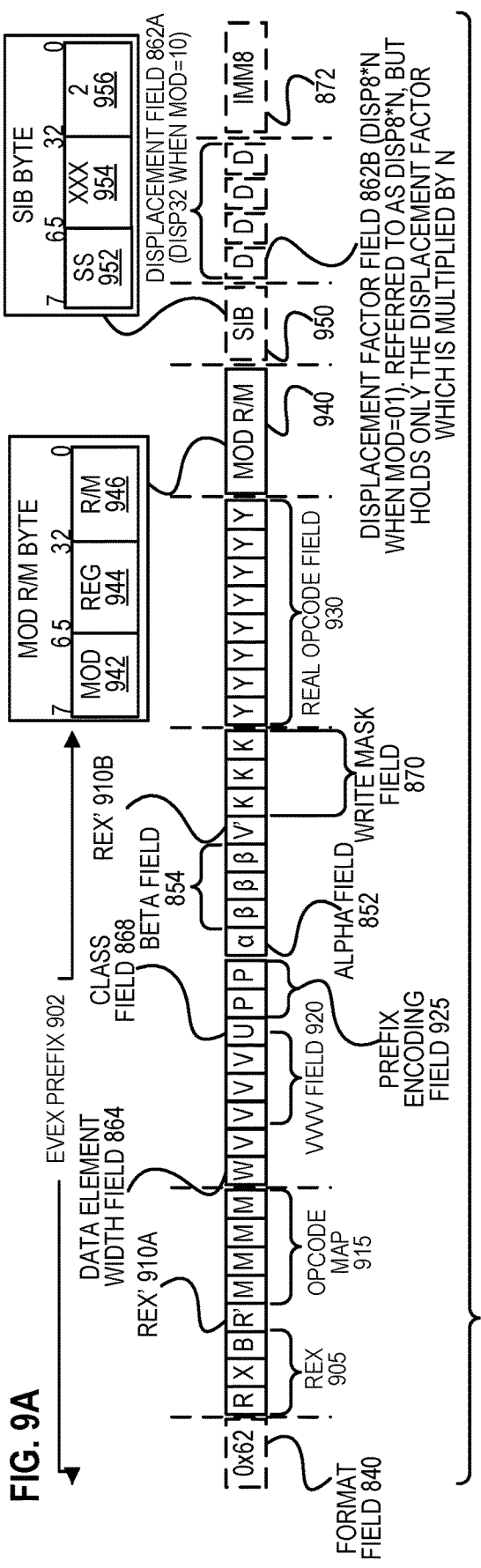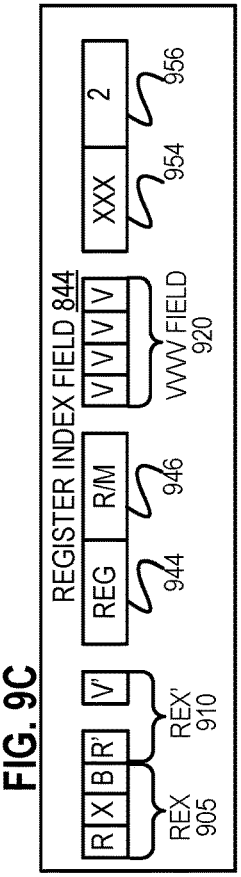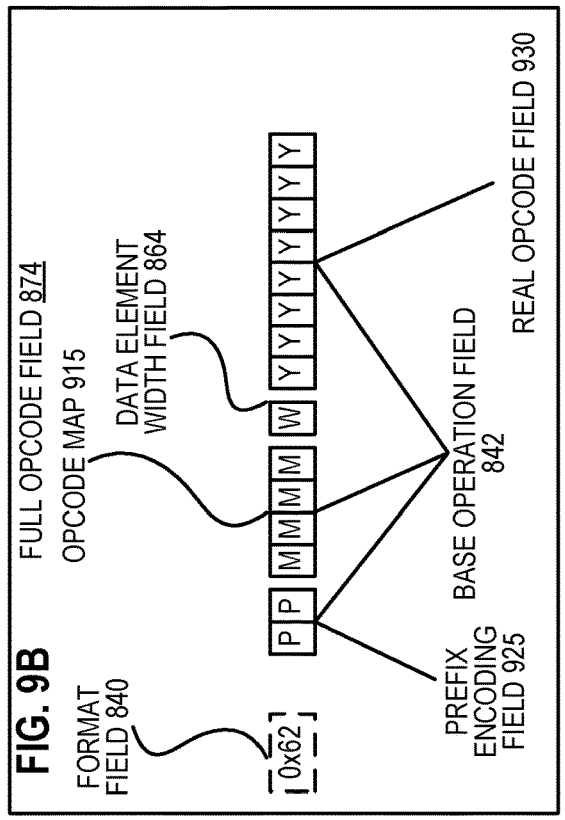

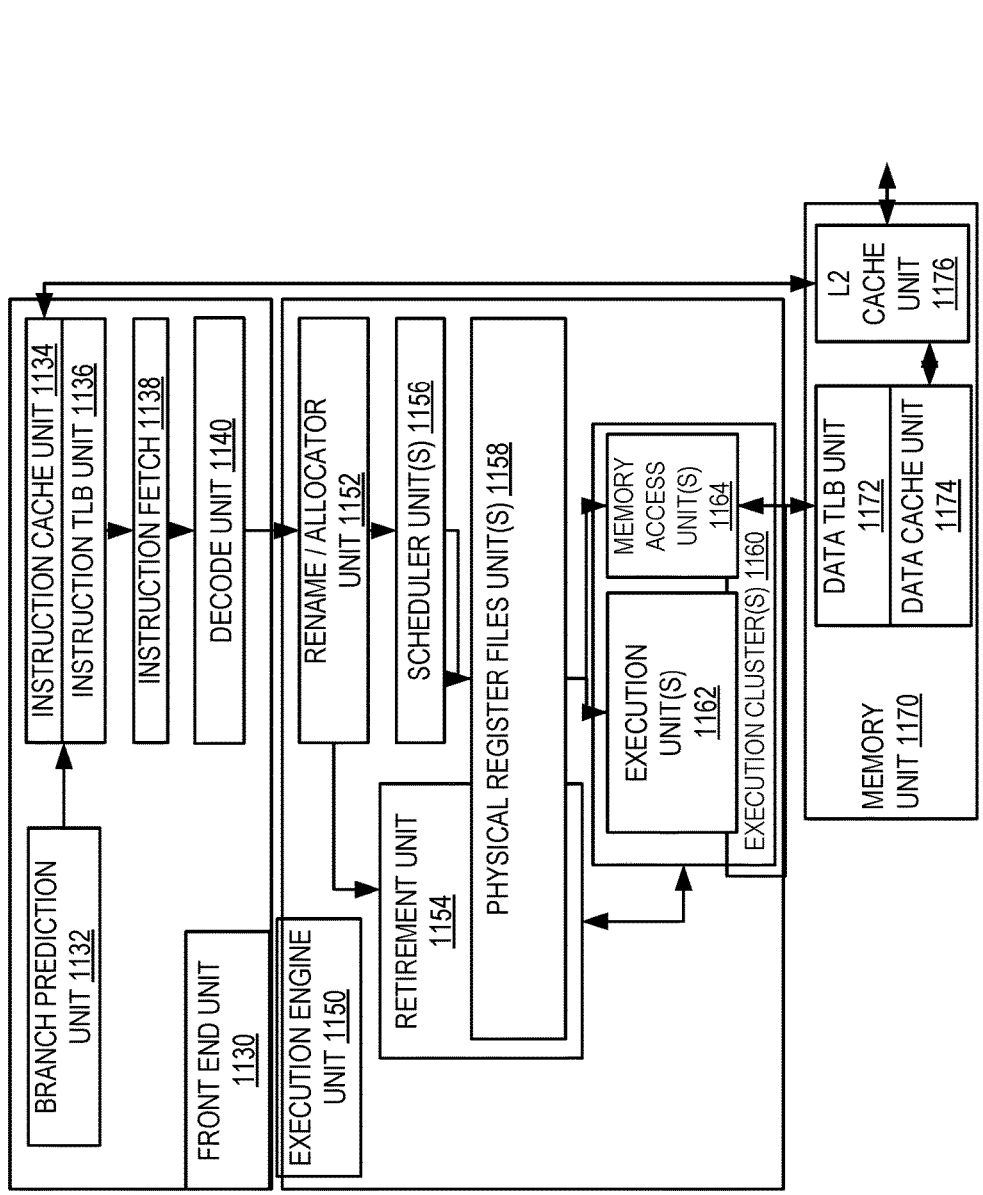
FIG. 11A
FIG. 11B

VARIABLE FORMAT, VARIABLE SPARSITY MATRIX MULTIPLICATION INSTRUCTION

FIELD OF THE INVENTION

The field of invention relates generally to computer processor architecture, and, more specifically, to a variable format, variable sparsity matrix multiplication instruction.

BACKGROUND

Machine learning architectures, such as deep neural networks, have been applied to fields including computer vision, speech recognition, natural language processing, audio recognition, social network filtering, machine translation, bioinformatics and drug design. Deep Learning is a class of machine learning algorithms. Maximizing flexibility and cost-efficiency of deep learning algorithms and computations may assist in meeting the needs of deep learning processors, for example, those performing deep learning in a data center.

Matrix multiplication is a key performance/power limiter for many algorithms, including machine learning. Some conventional matrix multiplication approaches are specialized, for example they lack the flexibility to support a variety of data formats (signed and unsigned 8b/16b integer, 16b floating-point) with wide accumulators, and the flexibility to support both dense and sparse matrices.

BRIEF DESCRIPTION OF THE DRAWINGS

The present invention is illustrated by way of example and not limitation in the figures of the accompanying drawings, in which like references indicate similar elements and in which:

FIG. 8A is a block diagram illustrating a format for variable format, variable sparsity matrix multiplication (VFVSMM) instruction, according to some embodiments;

FIG. 8B is a block diagram illustrating a generic vector friendly instruction format and class A instruction templates thereof according to embodiments of the invention;

FIG. 8C is a block diagram illustrating the generic vector friendly instruction format and class B instruction templates thereof according to embodiments of the invention;

FIG. 9A is a block diagram illustrating an exemplary specific vector friendly instruction format according to embodiments of the invention;

FIG. 9B is a block diagram illustrating the fields of the specific vector friendly instruction format that make up the full opcode field according to one embodiment of the invention;

FIG. 9C is a block diagram illustrating the fields of the specific vector friendly instruction format that make up the register index field according to one embodiment of the invention;

FIG. 11A is a block diagram illustrating both an exemplary in-order pipeline and an exemplary register renaming, out-of-order issue/execution pipeline according to embodiments of the invention;

FIG. 11B is a block diagram illustrating both an exemplary embodiment of an in-order architecture core and an exemplary register renaming, out-of-order issue/execution architecture core to be included in a processor according to embodiments of the invention;

FIG. 12A is a block diagram of a single processor core, along with its connection to the on-die interconnect network and with its local subset of the Level 2 (L2) cache, according to embodiments of the invention;

FIG. 12B is an expanded view of part of the processor core in FIG. 12A according to embodiments of the invention;

FIG. 14 shown a block diagram of a system in accordance with one embodiment of the present invention;

FIG. 15 is a block diagram of a first more specific exemplary system in accordance with an embodiment of the present invention;

FIG. 16 is a block diagram of a second more specific exemplary system in accordance with an embodiment of the present invention;

FIG. 17 is a block diagram of a System-on-a-Chip (SoC) in accordance with an embodiment of the present invention.

DETAILED DESCRIPTION OF THE EMBODIMENTS

Figure 1:
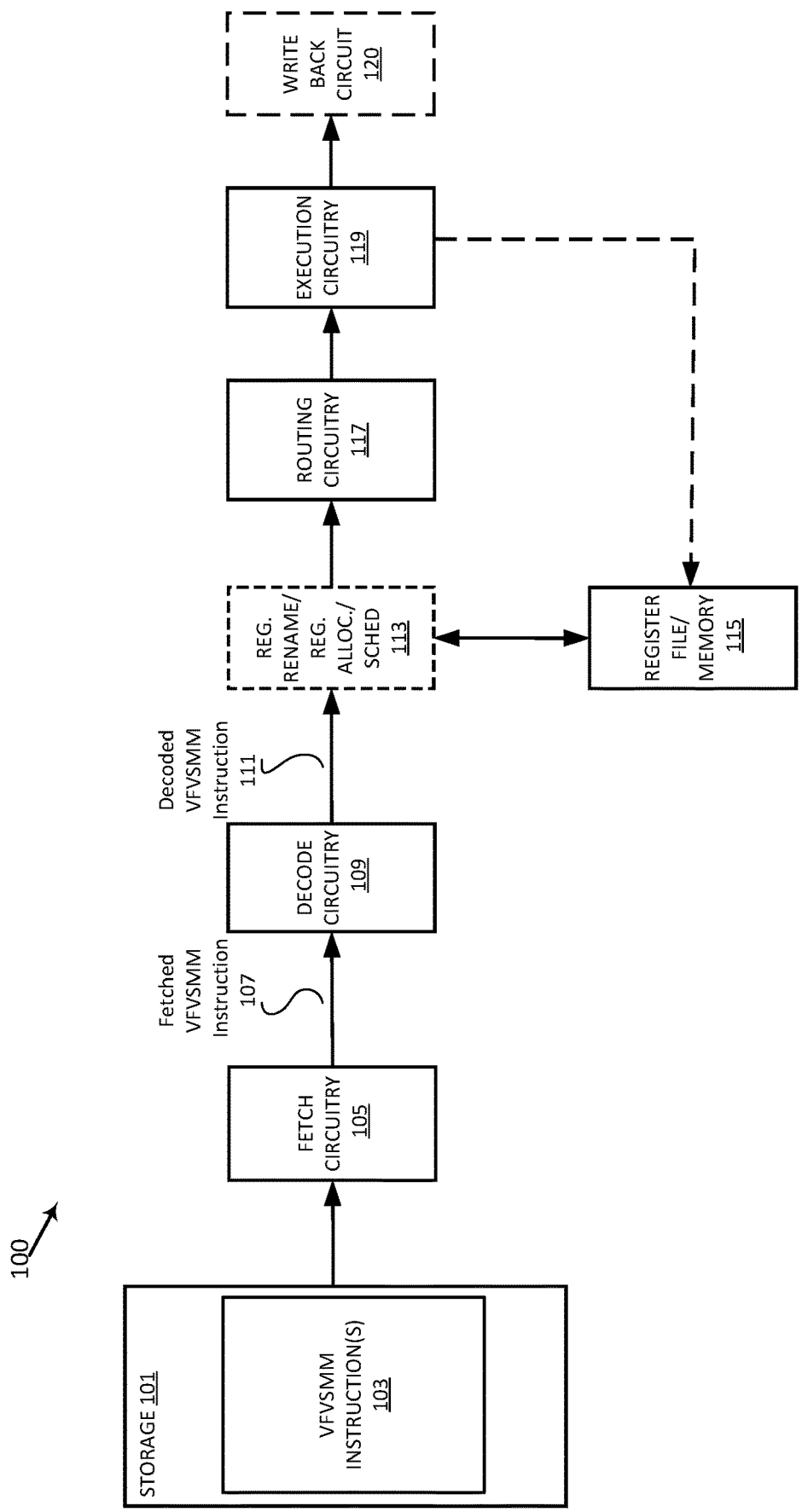
FIG. 1 is a block diagram illustrating processing components for executing a variable-format, variable-sparsity matrix multiplication (VFVSMM) instruction, according to an embodiment.

In the following description, numerous specific details are set forth. However, it is understood that some embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments if explicitly described.

Disclosed embodiments provide improved execution of a variable format, variable sparsity matrix multiplication (VFVSMM) instruction. Disclosed embodiments perform matrix multiplication and multiply-accumulation for a variety of different data formats including signed/unsigned 8 bit/16 bit integer and 16 bit/32 bit floating-point formats. Furthermore, disclosed embodiments use blocking, handshake-based routing with broadcasting of matrix data elements among nodes in a processing array to support either dense or sparse matrix operands and to avoid multiplying by zeros of sparse matrices. Furthermore, a disclosed 8-bit mode is optimized to achieve 4× throughput by reconfiguring each processing unit in the processing array into a 2×2 array.

As used herein, sparsity of a matrix is defined as the proportion of non-zero elements, the remaining elements being zero or null. For example, in some embodiments, a sparse matrix having a sparsity of 0.125, has only ⅛th, or 12.5% of its elements with non-zero values. It is also possible for sparsity to be used to refer to the proportion of elements that have a zero value. Either way, disclosed embodiments exploit the sparsity of one or both matrices in a matrix multiplication to improve power, performance, flexibility, and/or functionality.

Flexibility, functionality, and cost are expected to be improved by disclosed embodiments by providing circuitry to multiply matrices having various formats and various degrees of sparsity. As opposed to some approaches that would use different hardware dedicated to each of the various formats and sparsity, disclosed embodiments provide hardware that can be configured to accommodate the variations. As opposed to some approaches that would waste power and performance multiplying zero-elements of the matrices, disclosed embodiments avoid at least some zero multiplications when operating in a dense-sparse or sparse-sparse mode, as described below.

Disclosed embodiments are expected to improve cost and area by providing a single, reconfigurable execution circuit to support a variety of data formats—including both integer and floating point—in comparison to some approaches that rely on different circuits specializing in different data formats. Disclosed embodiments provide a matrix multiplication accelerator that supports both floating-point and integer data formats, with accumulation. The disclosed accelerator can also be optimized to operate on sparse matrices, by avoiding multiplying the zero elements. By combining these features into a reconfigurable circuit, disclosed embodiments thus enable a single matrix multiplication accelerator circuit to support multiple precision formats with wide accumulators, while efficiently reconfiguring for either dense or sparse matrices. The disclosed accelerator embodiments improve area and energy efficiency while providing flexibility to support many typical matrix multiplication workloads, such as machine learning.

FIG. 1 is a block diagram illustrating processing components for executing variable-format, variable sparsity matrix multiplication instruction(s) VFVSMM instruction(s) 103, according to some embodiments. As illustrated, storage 101 stores VFVSMM instruction(s) 103 to be executed. As described further below, in some embodiments, computing system 100 is a single instruction, multiple data (SIMD) processor to concurrently process multiple data elements based on a single instruction.

In operation, the VFVSMM instruction(s) 103 is to be fetched from storage 101 by fetch circuitry 105. The fetched VFVSMM instruction 107 is to be decoded by decode circuitry 109. The VFVSMM instruction format, which is further illustrated and described with respect to FIGS. 7, 8A-B, and 9A-D, has fields (not shown here) to specify an opcode, and destination, multiplier, multiplicand, and summand complex vectors. Decode circuitry 109 decodes the fetched VFVSMM instruction 107 into one or more operations. In some embodiments, this decoding includes generating a plurality of micro-operations to be performed by execution circuitry (such as execution circuitry 119) in conjunction with routing circuitry 118. The decode circuitry 109 also decodes instruction suffixes and prefixes (if used). Execution circuitry 119, operating in conjunction with routing circuitry 117, is further described and illustrated below, at least with respect to FIGS. 2-6, 11A-B and 12A-B.

In some embodiments, register renaming, register allocation, and/or scheduling circuit 113 provides functionality for one or more of: 1) renaming logical operand values to physical operand values (e.g., a register alias table in some embodiments), 2) allocating status bits and flags to the decoded instruction, and 3) scheduling the decoded VFVSMM instruction 111 for execution on execution circuitry 119 out of an instruction pool (e.g., using a reservation station in some embodiments).

Registers (register file) and/or memory 115 store data as operands of decoded VFVSMM instruction 111 to be operated on by execution circuitry 119. Exemplary register types include writemask registers, packed data registers, general purpose registers, and floating point registers, as further described and illustrated below, at least with respect to FIG. 10.

In some embodiments, write back circuit 120 commits the result of the execution of the decoded VFVSMM instruction 111. Execution circuitry 119 and system 100 are further illustrated and described with respect to FIGS. 2-6, 11A-B and 12A-B.

Figure 2:
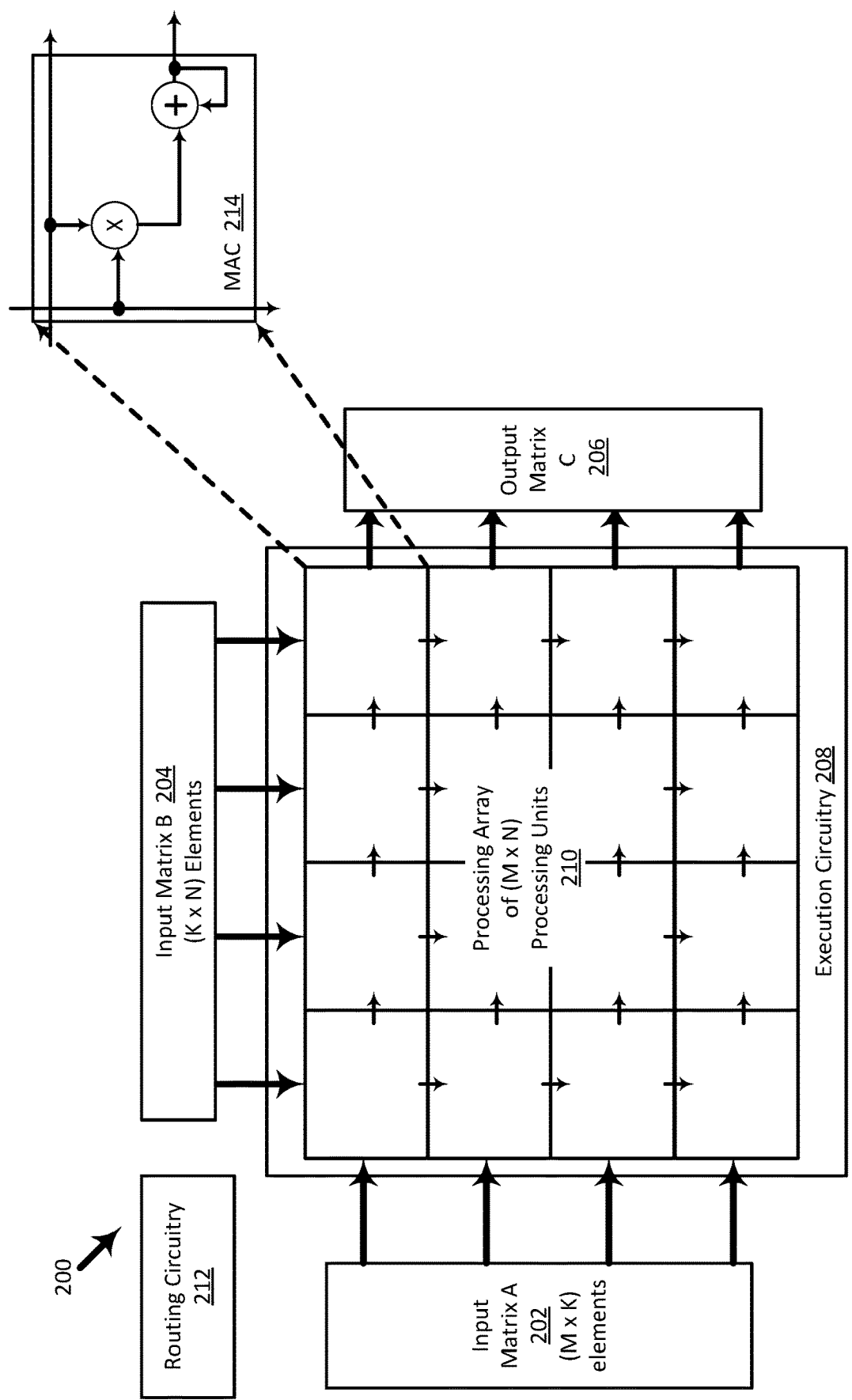
FIG. 2 is a block diagram of a processing array to execute a variable-format, variable-sparsity matrix multiplication (VFVSMM) instruction, according to some embodiments.

FIG. 2 is a block diagram of a processing array to execute a variable-format, variable-sparsity matrix multiplication (VFVSMM) instruction, according to some embodiments. As shown, system 200 includes input matrix A 202, input matrix B 204, output matrix C 206, and routing circuitry 212. Also shown is execution circuitry 208, which includes a processing array of (M×N) processing units 210. In some embodiments, each of the processing units in the processing array is a multiply-accumulate circuit, an expanded view of which is shown as MAC 214.

An advantage of the disclosed processing units 210 is that they can be reused to perform multiplications and multiply accumulates on matrices having a variety of different formats. For example, as described and illustrated with respect to FIG. 8A, disclosed embodiments can perform the VFVSMM instruction on any of various data formats, such as 8-bit integer, 16-bit integer, 32-bit integer, half-precision floating point, single-precision floating point, or double-precision floating point, and element size 712, in terms of a number of bits per matrix element. By avoiding the need to implement different hardware to process different types of data, disclosed embodiments provide a power and cost benefit by reusing the same circuitry for different types of data.

In some embodiments, for example when processing 8-bit integer data, execution circuitry throughput is quadrupled by configuring each processing unit to perform a 2×2 matrix multiplication.

As described herein, a processing unit is sometimes referred to as a processing element and is sometimes referred to as a processing circuit and may sometimes be referred to as a processing node. Regardless of the wording, the processing unit is intended to comprise circuitry to perform data path computations and provide control logic.

In operation, routing circuitry 212 and execution circuitry 208 operate in dense-dense mode, dense-sparse mode, or sparse-sparse mode, as follows.

Dense-Dense Mode

In some embodiments, the routing and the execution circuitry are placed into a dense-dense mode by software, for example by setting a control register controlling the routing and execution circuitry. Disclosed embodiments improve power and performance by avoiding multiplications involving zero elements of the sparse matrix. Disclosed embodiments provide a cost advantage by allowing the same circuitry to be reused in various modes, including in various sparsity conditions and with various data formats.

In some embodiments, the routing and execution circuitry are placed into a dense-dense mode as instructed by the VFVSMM instruction, for example using a suffix of the opcode. The format of the VFVSMM instruction is further described and illustrated with respect to FIGS. 8A-C and 9A-D. In some embodiments, the routing and execution circuitry enter a dense-dense mode in response to one or both of the A and B matrices being stored in packed format, with a specifier accompanying each matrix element and specifying the logical position of the element within the logical A or B matrix.

In operation, execution circuitry, using routing circuitry 212, operating in a dense-dense mode, in response to the decoded VFVSMM instruction, is to route each row of the specified A matrix, staggering subsequent rows, into a corresponding row of a processing array having (M×N) processing units, and route each column of the specified B matrix, staggering subsequent columns, into a corresponding column of the processing array. In some embodiments, each row and column is staggered by one clock cycle, allowing each processing element to infer the row and column addresses of each received A-matrix and B-matrix element based on a clock cycle and on a relative position of the processing unit within the processing array.

Continuing operation, each of the (M×N) processing units is to generate a product of each of K data elements received horizontally and K data elements received vertically, and to accumulate each generated product with a previous value of a corresponding element of the C matrix having a same relative matrix position as a position of the processing unit in the array.

Dense-Sparse Mode

In some embodiments, the routing circuitry and the execution circuitry are placed into a dense-sparse mode by software, for example by setting a control register controlling the routing and execution circuitry. Disclosed embodiments improve power and performance by avoiding multiplications involving zero elements of the sparse matrix.

Disclosed embodiments provide a cost advantage by allowing the same circuitry to be reused in various modes, including in various sparsity conditions and with various data formats.

In some embodiments, the routing and execution circuitry are placed into a dense-sparse mode as instructed by the VFVSMM instruction, for example using a suffix of the opcode. The format of the VFVSMM instruction is further described and illustrated with respect to FIGS. 8A-C and 9A-D. In some embodiments, the routing and execution circuitry enter a dense-sparse mode in response to one or both of the A and B matrices being stored in packed format, with a specifier accompanying each matrix element and specifying the logical position of the element within the logical A or B matrix.

It should be noted that the processor may be caused to execute a VFVSMM instruction in dense-sparse mode even if both the A and B matrices are dense matrices. As long as the sparse matrix in such a scenario is formatted to include address information for each data element, the processor could be constructed to conduct one or more address checks that would each determine an address match because the A and B matrices are dense matrices with adjacent addresses separated by one. Operating in dense-sparse mode in such a scenario would therefore incur some additional execution cost but may simplify the task of executing the VFVSMM instruction.

In some embodiments, in which the processor is to execute the VFVSMM instruction in dense-sparse mode, the specified B matrix is a sparse matrix (having a sparsity of less than one, the sparsity being defined as the proportion of non-zero elements, the remaining elements being zero or null), and is to comprise only non-zero elements of a logical matrix comprising (K×N) elements, with each element to include a field to specify its logical row and column addresses.

In operation, execution circuitry, using routing circuitry 212 and operating in the dense-sparse mode in response to the decoded VFVSMM instruction, is to route each row of the specified A matrix, staggering subsequent rows, into the corresponding row of a (M×N) processing array, and to route each column of the specified B matrix into the corresponding column of the processing array.

Being a sparse matrix, the specified B matrix is to be stored in and loaded from memory in a packed sparse format, storing only the non-zero elements. Subsequent elements of the A and B matrices may therefore have gaps in their row and column addresses. In some embodiments, each row is staggered by one clock cycle, allowing each processing element to infer the column address of each received A-matrix element based on a clock cycle.

Continuing operation, each of the (M×N) processing units in processing array 210, operating in a dense-sparse mode, is to determine, based on the clock and on a position of the processing unit within the processing array 210, a column and a row address of each horizontally received element. Each of the (M×N) processing units in processing array 210 is then to determine whether an address match exists between the logical row address of the vertically received element and the column address of the horizontally received element. When the match exists, the processing unit is to generate the product. And, when no match exists, the processing unit is to hold the horizontally received element and pass the vertically received element if the column address is larger than the logical row address, otherwise, hold the vertically received element and pass the horizontally received element.

Sparse-Sparse Mode

In some embodiments, the routing circuitry and the execution circuitry are placed into a sparse-sparse mode by software, for example by setting a control register controlling the routing and execution circuitry. Disclosed embodiments improve power and performance by avoiding multiplications involving zero elements of the sparse matrix. Disclosed embodiments provide a cost advantage by allowing the same circuitry to be reused in various modes, including in various sparsity conditions and with various data formats.

In some embodiments, the routing and execution circuitry are placed into the sparse-sparse mode as instructed by the VFVSMM instruction, for example using a suffix of the opcode. The format of the VFVSMM instruction is further described and illustrated with respect to FIGS. 8A-C and 9A-D. In some embodiments, the routing and execution circuitry enter the sparse-sparse mode in response to the A and B matrices being stored in packed format, with a specifier accompanying each element and specifying the logical position of the element within the logical A or B matrix.

In some embodiments, in which the processor is to execute the VFVSMM instruction in sparse-sparse mode, the specified A and B matrices are both sparse matrices (having a sparsity of less than one, the sparsity being defined as the proportion of non-zero elements, the remaining elements being zero or null). In such embodiments, the specified A and B matrices are each to be stored in memory as a packed sparse matrix comprising only non-zero elements of logical (M×K) and (K×N) matrices, respectively, with each element including a field to specify its logical row and column addresses.

In operation, execution circuitry, using routing circuitry 212 operating in the sparse-sparse mode, is to route each row of the specified A matrix into the corresponding row of a (M×N) processing array, and route each column of the specified B matrix into the corresponding column of the processing array.

Being sparse matrices, the specified A and B matrices are to be stored in and loaded from memory in packed sparse format, storing only the non-zero elements and including an address of the element in the logical array. Subsequent elements of the A and B matrices may therefore have gaps in their row and column addresses.

Continuing operation, each of the (M×N) processing units, operating in a sparse-sparse mode, is to compare the logical row address of the vertically received element and the logical column address of the horizontally received element. When an address match exists, the processing unit is to generate the product. And, when no match exists, the processing unit is to hold the horizontally received element and pass the vertically received element if the logical column address is larger than the logical row address, and, otherwise, hold the vertically received element and pass the horizontally received element.

Figure 3:
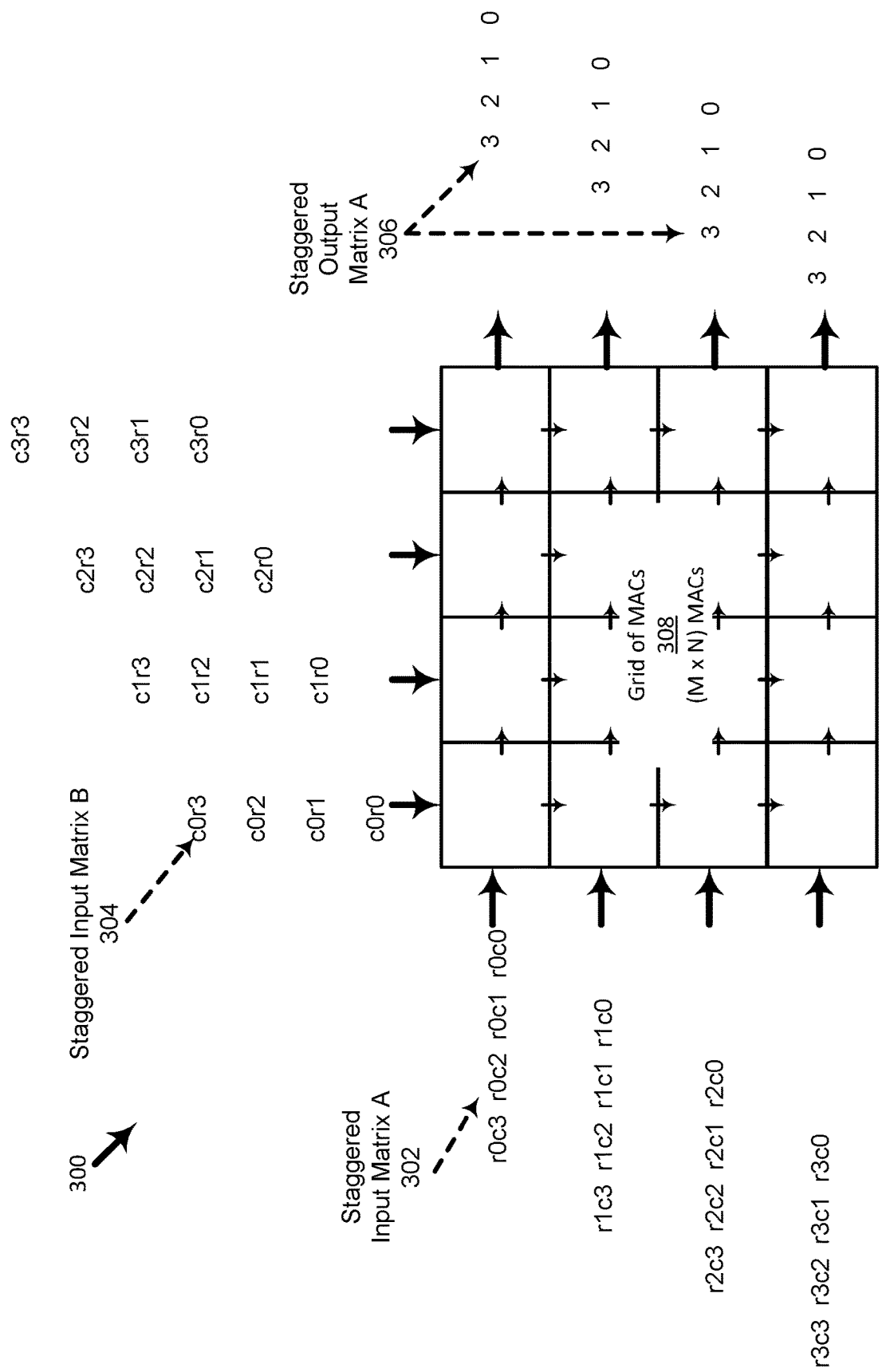
FIG. 3 is a block flow diagram illustrating partial execution of a variable-format, variable-sparsity matrix multiplication (VFVSMM) instruction, according to some embodiments.

FIG. 3 is a block flow diagram illustrating partial execution of a variable-format, variable-sparsity matrix multiplication (VFVSMM) instruction, according to some embodiments. As shown, execution circuitry 300 includes grid of MACs 308, the rows of which receive A-matrix elements from corresponding rows of input matrix A 302, and the columns of which receive B-matrix elements from corresponding columns of input matrix B 304. Grid of MACs 308 produces output matrix C 306. In some embodiments, when operating in dense-dense mode, the rows and columns are "staggered" by one clock cycle, allowing each processing element to infer the row and column addresses of each received A-matrix and B-matrix element based on a clock cycle and on a relative position of the processing unit within the processing array. As shown, row 1 of input matrix A 302 is routed one cycle before row 2, and two cycles before load 3.

In operation, when operating in a dense-dense mode, each of the (M×N) processing units is to generate K products of matching A-matrix and B-matrix elements received from the specified A and B matrices, respectively, a match to exist when the B-Matrix element has the same row address as a column address of the A-matrix element, and to accumulate each generated product with a corresponding element of the specified C-matrix having a same relative position as a position of the processing unit in the processing array.

When operating in a dense-sparse mode, each of the (M×N) MACs in grid of MACs 308 is to determine whether an address match exists between the specified logical row address of the B-matrix element and the column address of the A-matrix element and when the match exists, generate the product, and when no match exists, hold the A-matrix element and pass the B-matrix element when the column address of the A-matrix element is larger than the specified logical row address of the B-matrix element, and, otherwise, hold the B-matrix element and pass the A-matrix element.

When operating in sparse-sparse mode, each of the (M×N) MACs in grid of MACs 308 is to determine whether a match exists between the specified logical column address of the A-matrix element and the specified logical row address of the B-matrix element, and when the match exists, generate the product, and when no match exists, hold the A-matrix element and pass the B-matrix element when the specified logical column address of the A-matrix element is larger than the specified logical row address of the B-matrix element, and, otherwise, hold the B-matrix element and pass the A-matrix element.

Execution circuitry 300 is further described and illustrated below, at least with respect to FIGS. 2, 4-6, 11A-B and 12A-B

Figure 4:
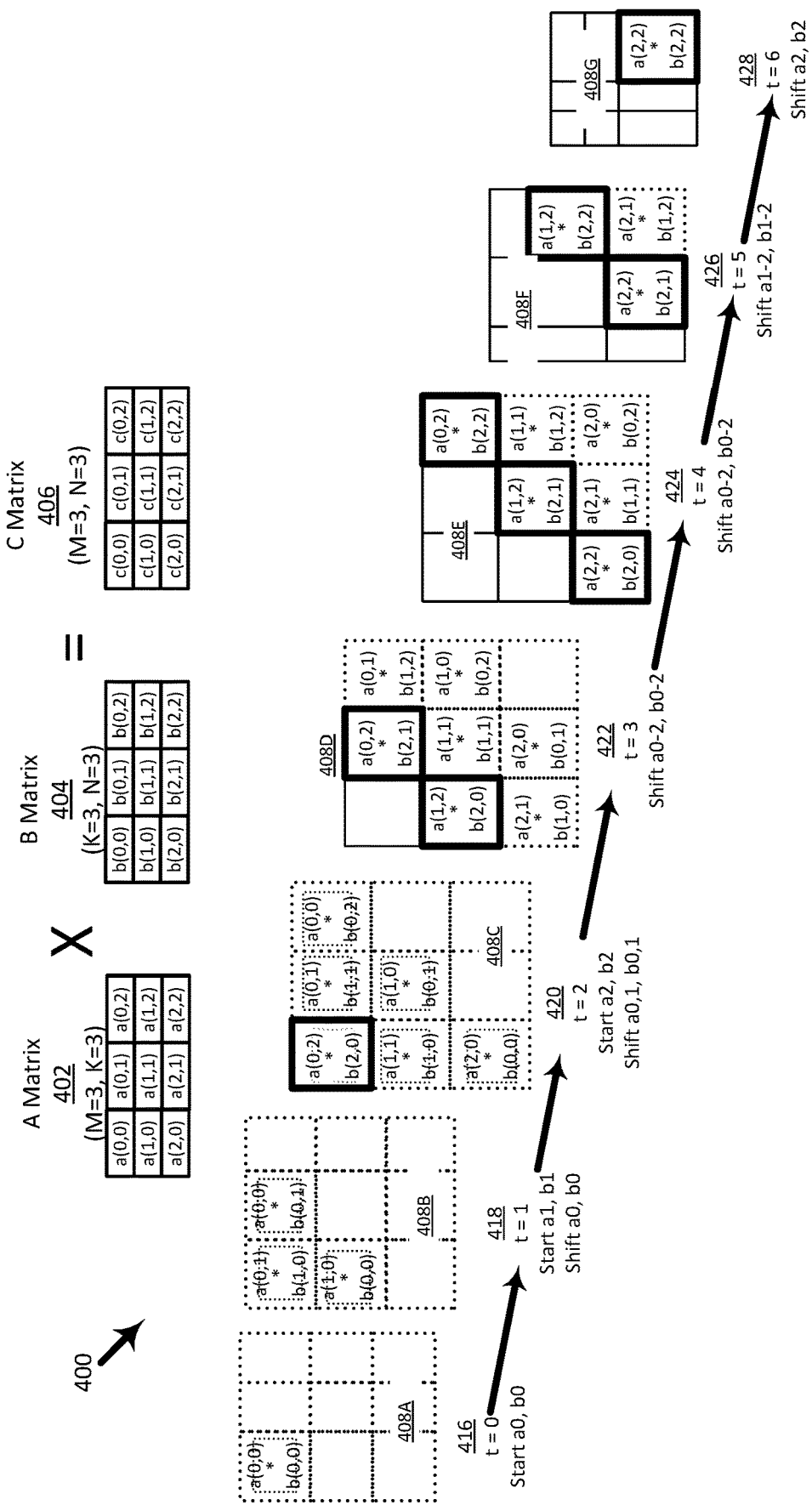
FIG. 4 is a block flow diagram illustrating an execution pipeline to execute a variable-format, variable-sparsity matrix multiplication (VFVSMM) instruction, according to some embodiments.

FIG. 4 is a block flow diagram illustrating an execution pipeline to execute a variable-format, variable-sparsity matrix multiplication (VFVSMM) instruction, according to some embodiments. As shown, A matrix 402 and B matrix 404 are both dense matrices. In operation, execution circuitry, operating in a dense-dense mode, in response to the decoded VFVSMM instruction, is to route each row of the specified A matrix, staggering subsequent rows, into a corresponding row of a processing array having (M×N) processing units, and route each column of the specified B matrix, staggering subsequent columns, into a corresponding column of the processing array. Also shown are seven consecutive snapshots 408A-G, taken at seven points along time line 400: 418, 420, 422, 424, 426, 426, and 428.

In some embodiments, staggering subsequent rows and columns refers to delaying the routing of each subsequent row and column into a corresponding row and column of the processing array by one cycle. Staggering the subsequent rows and columns offers an advantage of creating a pipeline to line up horizontal and vertical to perform 27 multiply-accumulates over 7 cycles, as is shown in snapshots 408A-G. Staggering rows and columns also allows each processing element to infer the row and column addresses of each received A-matrix and B-matrix element based on a clock cycle and on a relative position of the processing unit within the processing array As shown at snapshot 408A, row 0 of the A matrix 402 and column 0 of the B matrix 404 are routed into a corresponding row and a corresponding column of the processing array. Also at 408A, the corresponding elements of the A matrix 402 and B matrix 404 are multiplied at and accumulated with prior data in element C(0,0) of C Matrix 406.

At snapshot 408B, one cycle having elapsed, row 0 of the A matrix 402 and column 0 have been shifted by 1 spot, and row 1 of the A matrix 402 and column 1 of the B matrix 404 are routed into a corresponding row and a corresponding column of the processing array. Also at 408B, the corresponding elements of the A matrix 402 and B matrix 404 are multiplied at C(0,0), C(0,1), and C(1, 0). The product generated at C(0,0) is accumulated with the previous value generated at 408A.

At snapshot 408C, another cycle having elapsed, rows 0 and 1 of the A matrix 402 and columns 0 and 1 of the B matrix 404 have been shifted by 1 spot, and row 2 of the A matrix 402 and column 2 of the B matrix 404 are routed into a corresponding row and a corresponding column of the processing array. Also at 408C, the corresponding elements of the A matrix 402 and B matrix 404 are multiplied and accumulated with previous values, if any, at C(0,0), C(0,1), C(0,2), C(1, 0), C(1,1), and C(2,0). As indicated by its bold outline, the accumulated product generated at C(0,0) is the final value of C(0,0).

At snapshot 408D, another cycle having elapsed, rows 0-2 of the A matrix 402 and columns 0-2 of the B matrix 404 have been shifted by 1 spot. Also at 408D, the corresponding elements of the A matrix 402 and B matrix 404 are multiplied and accumulated with previous values, if any, at C(0,1), C(0,2), C(1, 0), C(1,1), C(1,2), C(2,0), and C(2,1). As indicated by their bold outlines, the accumulated products generated at C(0,1) and C(1,0) are the final values of C(0,1) and C(1,0).

At snapshot 408E, another cycle having elapsed, rows 0-2 of the A matrix 402 and columns 0-2 of the B matrix 404 have been shifted by 1 spot. Also at 408E, the corresponding elements of the A matrix 402 and B matrix 404 are multiplied and accumulated with previous values, if any, at C(0,2), C(1,1), C(1,2), C(2,0), C(2,1), and C(2,2). As indicated by their bold outlines, the accumulated products generated at C(0,2), C(1,1), and C(2,0) are the final values of C(0,2), C(1,1), and C(2,0).

At snapshot 408F, another cycle having elapsed, rows 1-2 of the A matrix 402 and columns 1-2 of the B matrix 404 have been shifted by 1 spot. Also at 408F, the corresponding elements of the A matrix 402 and B matrix 404 are multiplied and accumulated with previous values, if any, at C(1,2), C(2,1), and C(2,2). As indicated by their bold outlines, the accumulated products generated at C(2,1) and C(1,2) are the final values of C(1,2) and C(2,1).

At snapshot 408G, another cycle having elapsed, row 2 of the A matrix 402 and column 2 of the B matrix 404 have been shifted by 1 spot. Also at 408G, the corresponding elements of the A matrix 402 and B matrix 404 are multiplied and accumulated with previous values, if any, at C(2,2). As indicated by its bold outline, the accumulated product generated at C(2,2) is the final values of C(2,2).

Figure 5:
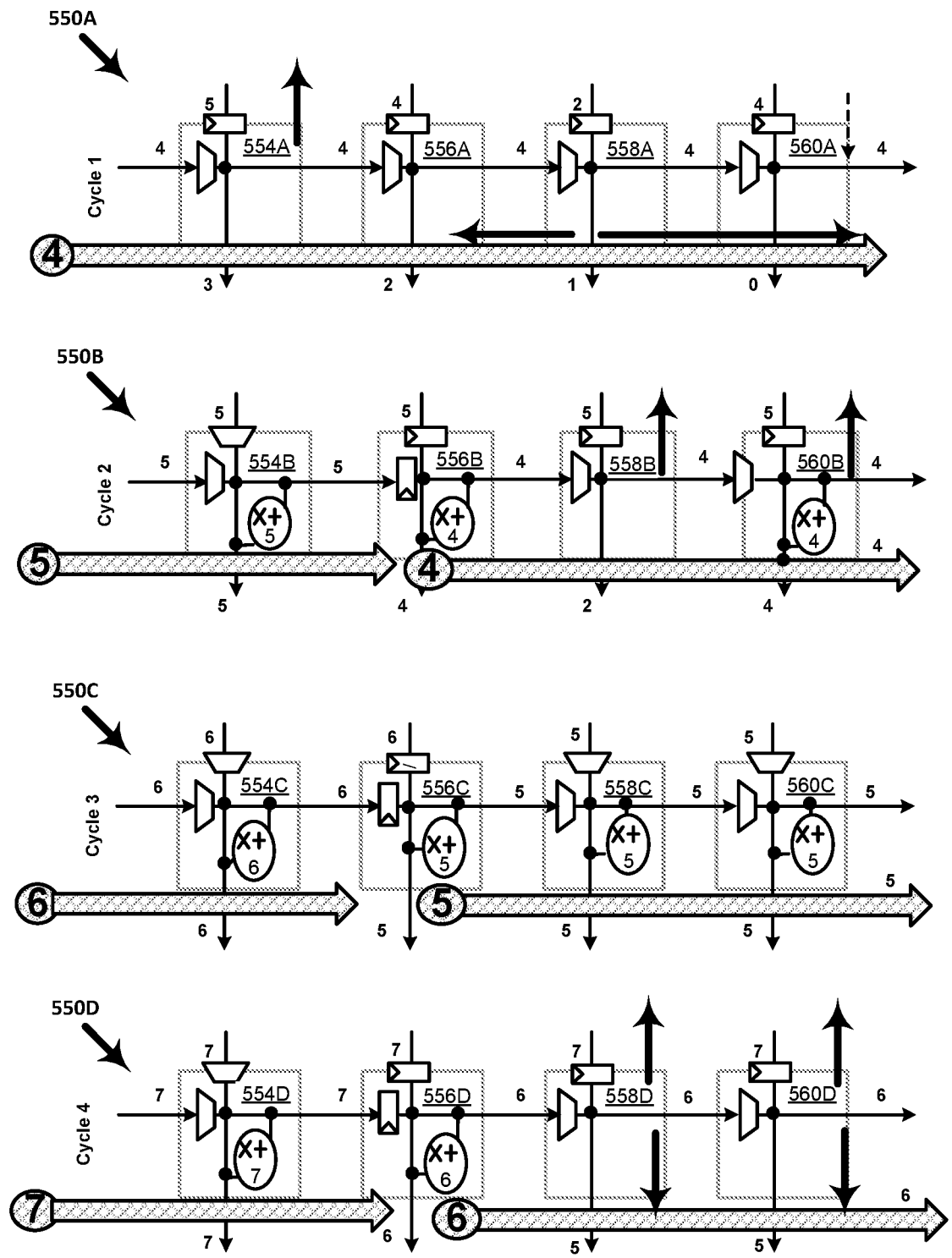
FIG. 5 is a block diagram illustrating routing control signals shared among processing units and routing circuitry while executing a variable-format, variable-sparsity matrix multiplication (VFVSMM) instruction, according to some embodiments.

FIG. 5 is a block diagram illustrating routing control signals shared among processing units and routing circuitry while executing a variable-format, variable-sparsity matrix multiplication (VFVSMM) instruction, according to some embodiments. Illustrated are four snapshots 550A-550D over four cycles of a portion—four nodes—of a single row of processing units operating in sparse-sparse mode. Each of the four snapshots 550A-550D illustrates four processing units 554A-D-560A-D, each of which receives a vertical data element input with a row address, and a horizontal data element input with a column address. In some embodiments, the row addresses of the horizontal elements and the column addresses of the vertical elements are implicitly defined by the relative position of the processing unit within the processing array.

Due to the formatting requirements of input matrices A and B, the row and column addresses will never decrease. Rather, the row and column addresses of consecutive data elements will each increase by one when in dense mode and by zero or more when in sparse mode until the end of row or end of column is reached (address will be unchanged in sparse mode if a hold request was asserted in the previous cycle, as illustrated and described with respect to snapshot 550A).

To illustrate handshaking control signals shared among nodes according to some embodiments, the processing array of FIG. 5 is to operate in sparse-sparse mode.

In operation, each processing unit operating in a sparse mode is to compare the row address of elements received vertically to the column address of elements received horizontally. (Note that such address checking can be performed, but is not needed when operating in dense mode, during which the address of each element is to increase by exactly one. When operating in dense-sparse mode, only addresses of inputs received from the sparse matrix need to be checked.)

If the addresses match, and if neither the vertical nor the horizontal element is requested to be held by a downstream processing unit, the processing unit multiplies the received elements and accumulates the product with previous contents of the corresponding destination matrix element. As used herein, the term, "corresponding" denotes a destination matrix element having a same relative position within the (M×N) destination matrix as the relative position of the processing unit within the (M×N) processing array.

But if the addresses do not match, the processing unit is to hold the element having a higher address and pass the other element. Since the row and column addresses never decrease, there is no point in holding the lower-addressed element; there will never be an address match. The processing unit, however, holds the larger-addressed element to be used in case the other element with an address matching address arrives in the future. In some embodiments, each processing unit has some storage element, such as a register or a flip flop, to hold the data element.

Also, when addresses do not match, the processing unit is to send a hold request upstream in the direction of the data element being held so that the data element can continue to be held, and sends a hold notice signal downstream in the direction of the data element being held.

In some embodiments, a processing unit that receives a hold request from a downstream node is to generate and send a corresponding hold request upstream.

In some embodiments, for example as illustrated and described with respect to snapshot 550A, a processing unit, in conjunction with routing circuitry, is to broadcast a data element downstream to two or more processing units that can use the element.

Table 1 lists various handshake controls used among processing units.

TABLE 1

Handshake Controls

| Signal | Description |
| --- | --- |
| Hold Request | Request upstream node to hold |
| Hold Notice | Notify downstream of plan to hold |

To describe the execution snapshots of FIG. 5, before cycle 1 550A, the four processing units 554A-560A had vertical elements with row addresses equal to 3, 2, 1, and 0, respectively. As shown, the vertical data elements arriving in cycle 1 550A at processing units 556A and 560A both have a row address equal to "4," but may have different data because they are in different columns. Also in cycle 1 550A, a horizontal element having a column address equal to 4 is broadcast to every processing unit that can use it (due to the horizontal hold request generated by processing unit 558A during cycle 1 550A, the data element having column address equal to "4" is to be held during cycle 2 550B in a flip flop at processing node 556B. Also in cycle 1, the horizontal hold request from processing unit 558A causes processing unit 556A to hold the horizontal element, addressed as "4" during the next cycle, repeating the data element in cycle 2 550B.

As shown, the vertical data element received by processing unit 558A in cycle 1, has a row address equal to "2" and was held by a flip flop presumably because of a vertical hold request during the previous cycle. There is no vertical hold request for cycle1 by processing unit 558A. Because horizontal input address "4" is higher than the vertical input address, "2," processing unit 558A generates a horizontal hold request and sends it back to 556A, causing that flip-flop in 556B to close in cycle2.

As shown, processing unit 558A during cycle 1 550A also generates and sends a horizontal hold notice downstream. In operation, downstream processing units that receive the horizontal hold notice put it to one or more of uses (not shown): 1) there may be multiple hold requests which propagate upstream and hold notify is sent from the node that will hold the data. In this case, if 560A had received a hold request during cycle 1, the hold notify from 558A would signal to node 560A that some node upstream was holding that data, so 560A would not need to. 2) the hold notify out from a node also affects whether a multiply is performed.

Continuing execution in cycle 2 550B, multiply-accumulates occur at processing units 554B, 556B and 560B due to matching addresses between incoming elements with address of 5, between registered elements with address of 4, and between an incoming and a registered element with address of 4, respectively.

Continuing execution at cycle 3 550C, multiply-accumulates occur at all four nodes because an address match exists in each case between incoming elements (as in 554C, 558C, and 560C) or between registered elements (as in 556C). Note that processing unit 554C performs a multiply-accumulate on incoming data elements, and the processing unit 556C performs the multiply-accumulates on registered data elements. In some embodiments, as shown, the execution circuit, in response to determining an address match between horizontal and vertical elements, performs the multiply-accumulate on registered elements having an address of 5 at 556C, and then performs the multiply-accumulates of the incoming elements having an address of 6 during the next cycle.

Continuing execution at cycle 4 550D, multiply-accumulates occur at 550D because an address match exists between incoming (as in 554D) or registered (as in 556D) elements.

Figure 6:
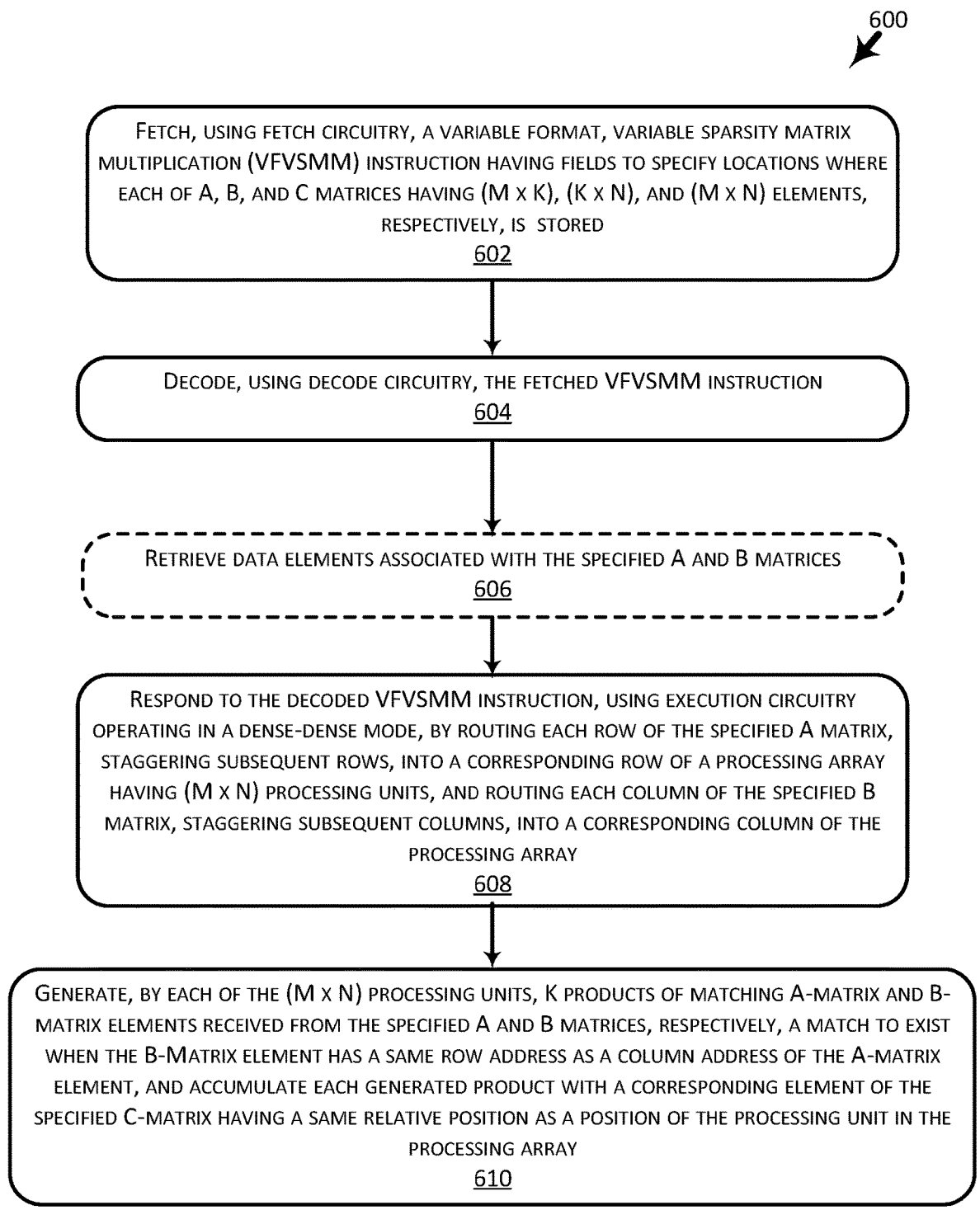
FIG. 6 is a block flow diagram illustrating a processor executing a variable-format, variable-sparsity matrix multiplication (VFVSMM), according to some embodiments.

FIG. 6 is a block flow diagram illustrating a processor executing a variable-format, variable-sparsity matrix multiplication (VFVSMM), according to some embodiments. As shown, a processor executing flow 600 in response to a VFVSMM instruction at 602 is to fetch, using fetch circuitry, a variable format, variable sparsity matrix multiplication (VFVSMM) instruction having fields to specify locations where each of A, B, and C matrices having (M×K), (K×N), and (M×N) elements, respectively, is stored. At 604, the processor is to decode, using decode circuitry, the fetched matrix multiplication instruction. In some embodiments, at 606, the processor is to retrieve data elements associated with the specified A and B matrices. Operation 606 is optional, as indicated by its dashed border, insofar as the data elements may be retrieved at a different time, or not at all. At 608, the processor is to respond to the decoded VFVSMM instruction, using execution circuitry operating in a dense-dense mode, by routing each row of the specified A matrix, staggering subsequent rows, into a corresponding row of a processing array having (M×N) processing units, and routing each column of the specified B matrix, staggering subsequent columns, into a corresponding column of the processing array. In some embodiments, not shown, the processor is to route each row of the specified A matrix and each column of the specified B matrix at a rate of one element per clock cycle and to stagger each subsequent row and subsequent column by one clock cycle, and each of the (M×N) processing units is to infer column and row addresses of each received A-matrix and B-matrix element based on a clock cycle and on a relative position of the processing unit within the processing array. In some embodiments, not shown, the processor maintains an element count or element index, wherein each of the processing units refers to the element count, rather than to infer anything. In some embodiments, not shown, each of the A matrix elements and B matrix elements includes a field to specify its logical position within the A or B matrices. At 610, the processor is to generate, by each of the (M×N) processing units, K products of matching A-matrix and B-matrix elements received from the specified A and B matrices, respectively, a match to exist when the B-Matrix element has a same row address as a column address of the A-matrix element, and to accumulate each generated product with a corresponding element of the specified C-matrix having a same relative position as a position of the processing unit in the processing array.

Figure 7:
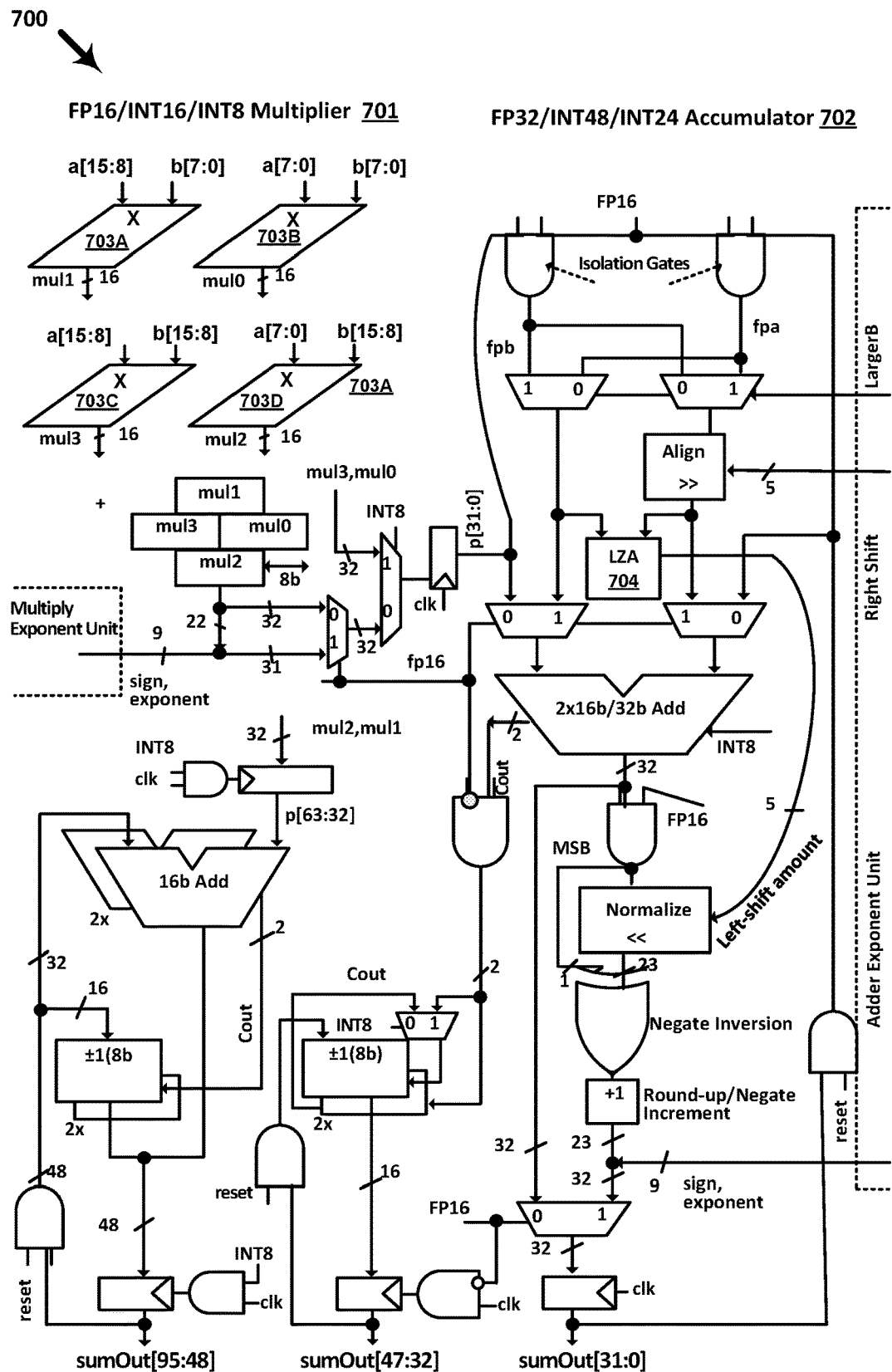
FIG. 7 is a block diagram illustrating a variable-precision integer/floating point multiply accumulate circuit, according to some embodiments.

FIG. 7 is a block diagram illustrating a variable-precision integer/floating point multiply accumulate circuit, according to some embodiments. As shown, multiply-accumulate circuit 700 includes FP16/INT16/INT8 multiplier 701 and FP32/INT48/INT24 accumulator 702.

In operation, FP16/INT16/INT8 multiplier 701 is to be reconfigured between 8b/16b integers and 16b floating-point inputs to support differing performance, numerical range and precision requirements. Furthermore, wide accumulators enable more accurate results for high-dimension matrices. The MAC is organized as a two-cycle pipeline of multiply followed by accumulate. Four 8b multipliers 703A-703D, each independently signed/unsigned reconfigurable per input, deliver 4-way 16b and 1-way 32b results in INT8 and INT16 modes, respectively. The 32b result uses each of these as a 16b multiply quadrant, with the results summed using correct significance. Floating-point operations map the 11b mantissa multiply to the 16b multiplier, with the entire unnormalized 22b significand sent to the subsequent adder stage along with a single-precision product exponent. The unnormalized product requires only an extra guard bit for floating-point add, while removing normalization from the multiply critical path. FP16 multiplication result is fully representable by the FP32 product range and accuracy, enabling removal of under/overflow detection and saturation logic, as well as any rounding logic in the multiplier.

Latency of the FP32 adder directly affects MAC throughput since it cannot be pipelined for back-to-back accumulation. Instead of a post-addition leading-zero-detector (LZD), a leading zero anticipator (LZA 704) is used in parallel with the 32b adder to compute normalization left shifts. The adder output may need to be negated for subtract operations to produce an unsigned mantissa. Criticality of the late-arriving adder MSB is hidden by delaying this negation step until after normalization. Two's complement negation also requires an increment after the inversion operation. This is merged with the final rounding incrementer to remove it from the critical path. The 32b integer product accumulates with the mantissa adder for area-efficient reconfiguration, while the 16b products require two additional 16b adders for 4-way throughput. Wide integer accumulation uses four 8b incrementers/decrementers for the upper bits, two of which can reconfigured to operate as a 16b unit for the 48b accumulation. Bypass multiplexers reduce critical path when reconfiguring the mantissa datapath for integer mode. Optimally placed datapath isolation gates and mode-based clock gating ensure no switching activity in unused logic and clock nodes. Adding INT48 support to the FP32 accumulator increases area by 20%, while 4-way INT24 support grows this by an incremental 8%.

Figure 8A:
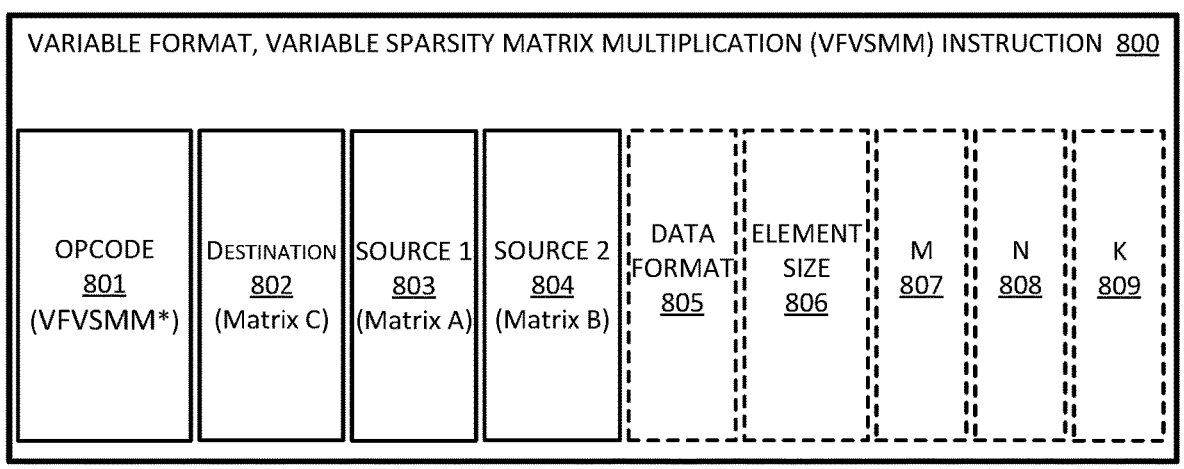
FIGS. 8A-8C are block diagrams illustrating a generic vector friendly instruction format and instruction templates thereof according to embodiments of the invention.

FIG. 8A is a block diagram illustrating a format for a variable-format, variable-sparsity matrix multiplication (VFVSMM) instruction, according to some embodiments. As shown, VFVSMM instruction 800 includes opcode 801 (VFVSMM*), and fields to specify destination 802, source 1 803 and source 2 804 matrices. As used herein the source 1, source 2, and destination matrices are sometimes referred to as the A, B, and C matrices, respectively. VFVSMM instruction 800 further includes optional fields to specify data format 805, such as integer, half-precision floating point, single-precision floating point, or double-precision floating point, and element size 806, in terms of a number of bits per matrix element. Data format 805 may even specify an implementation-dependent, custom format. VFVSMM instruction 800 sometimes includes fields to specify M 807, N 808, and K 809, where the specified A, B, and C matrices have (M×K), (K×N), and (M×N) data elements, respectively. As indicated by their dashed borders, data format 805, element size 806, M 807, N 808, and K 809 are optional, insofar as they may be omitted, thereby assuming predetermined default values. In some embodiments, one or more of data format 805, element size 806, M 807, N 808, and K 809 are specified as part of opcode 801, for example as a selected code for the opcode, a suffix, or a prefix. For example, opcode 801 may include a suffix, such as "B," "W," "D," or "Q," to specify an element size of eight, sixteen, thirty-two, or sixty-four bits, respectively. Opcode 801 is shown as including an asterisk to indicate that it may optionally include additional prefixes or suffixes to specify instruction behaviors. If VFVSMM instruction 800 does not specify any of the optional parameters, predetermined default values are applied as needed. The format of VFVSMM instruction 800 is further illustrated and described with respect to FIGS. 8B-C and FIGS. 9A-D.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 8B:
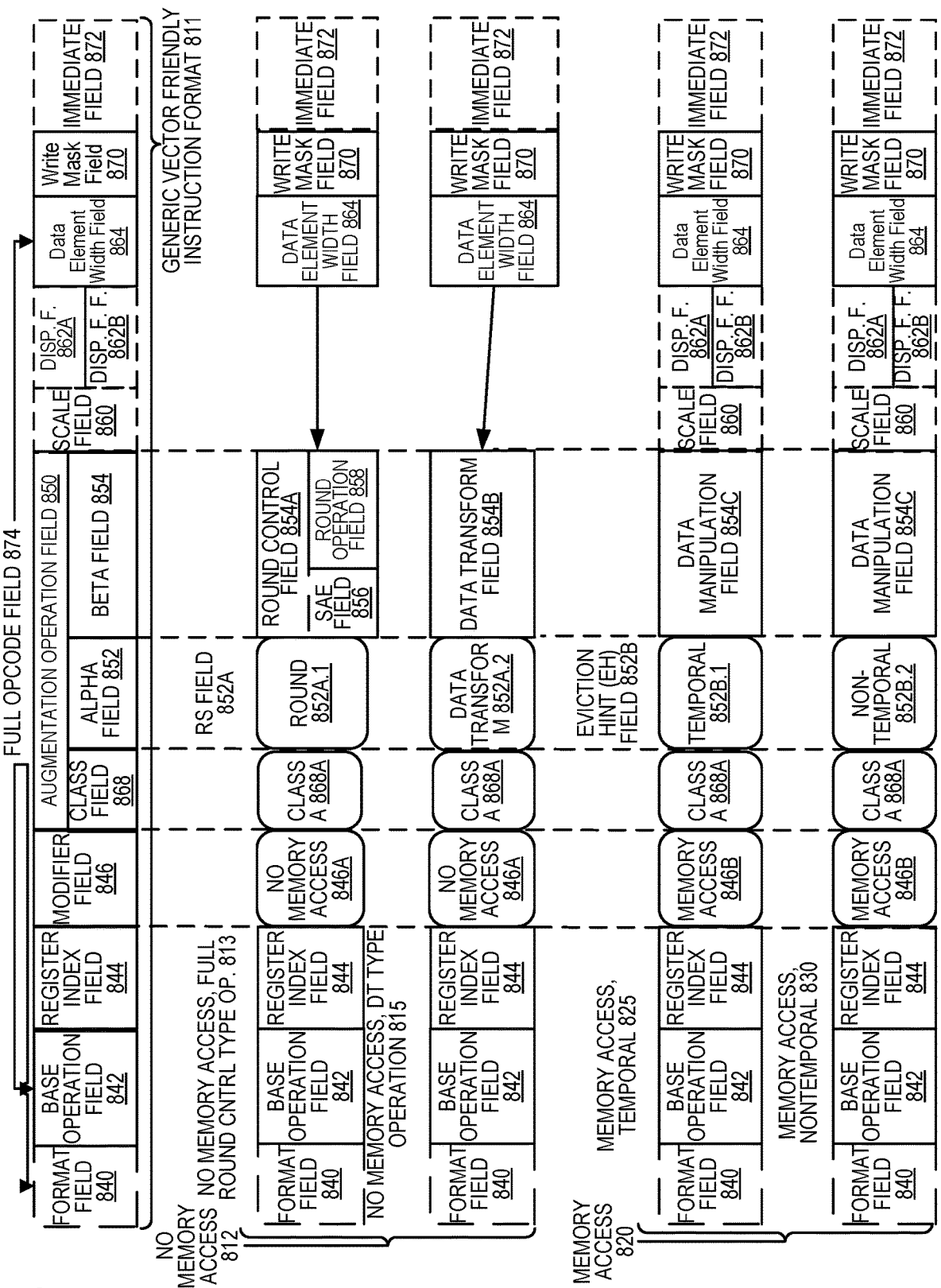
Figure 8C:
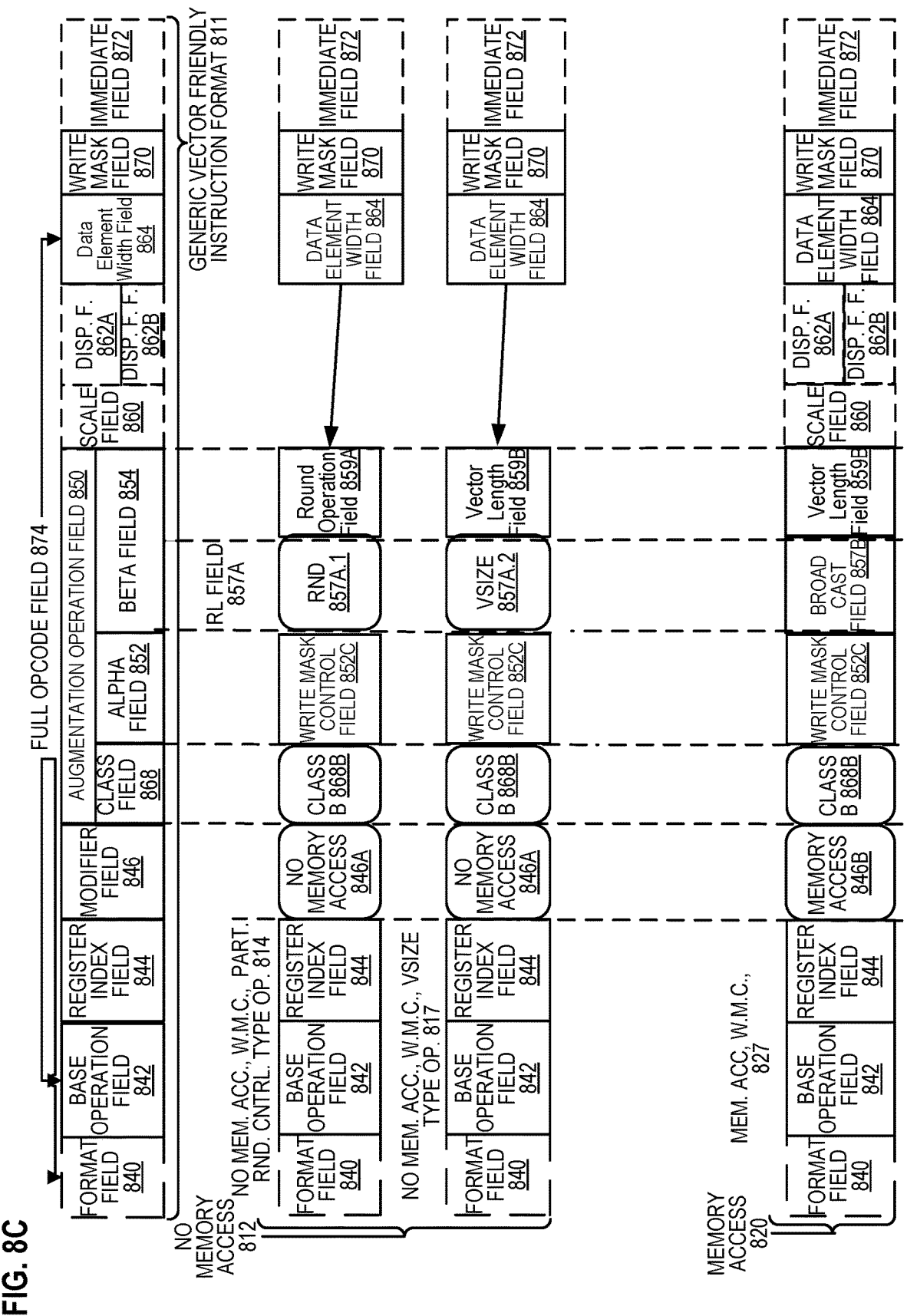

FIGS. 8B-8C are block diagrams illustrating a generic vector friendly instruction format and instruction templates thereof according to embodiments of the invention. FIG. 8B is a block diagram illustrating a generic vector friendly instruction format and class A instruction templates thereof according to embodiments of the invention; while FIG. 8C is a block diagram illustrating the generic vector friendly instruction format and class B instruction templates thereof according to embodiments of the invention. Specifically, a generic vector friendly instruction format 811 for which are defined class A and class B instruction templates, both of which include no memory access 812 instruction templates and memory access 820 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doublewordsize elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 8B include: 1) within the no memory access 812 instruction templates there is shown a no memory access, full round control type operation 813 instruction template and a no memory access, data transform type operation 815 instruction template; and 2) within the memory access 820 instruction templates there is shown a memory access, temporal 825 instruction template and a memory access, non-temporal 830 instruction template. The class B instruction templates in FIG. 8B include: 1) within the no memory access 812 instruction templates there is shown a no memory access, write mask control, partial round control type operation 814 instruction template and a no memory access, write mask control, vsize type operation 817 instruction template; and 2) within the memory access 820 instruction templates there is shown a memory access, write mask control 827 instruction template.

The generic vector friendly instruction format 811 includes the following fields listed below in the order illustrated in FIGS. 8B-8C.

Format field 840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 842—its content distinguishes different base operations.

Register index field 844—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 846—its content distinguishes occurrences of instructions in the generic vector instruction format that specify memory access from those that do not; that is, between no memory access 812 instruction templates and memory access 820 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 850—its content distinguishes which one of a variety of different operations to be performed in addition to the base operation. This field is context specific. In one embodiment of the invention, this field is divided into a class field 868, an alpha field 852, and a beta field 854. The augmentation operation field 850 allows common groups of operations to be performed in a single instruction rather than 2, 3, or 4 instructions.

Scale field 860—its content allows for the scaling of the index field's content for memory address generation (e.g., for address generation that uses $2^{scale}$*index+base).

Displacement Field 862A—its content is used as part of memory address generation (e.g., for address generation that uses $2^{scale}$*index+base+displacement).

Displacement Factor Field 862B (note that the juxtaposition of displacement field 862A directly over displacement factor field 862B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 874 (described later herein) and the data manipulation field 854C. The displacement field 862A and the displacement factor field 862B are optional in the sense that they are not used for the no memory access 812 instruction templates and/or different embodiments may implement only one or none of the two.

Data element width field 864—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 870 allows for partial vector operations, including loads, stores, arithmetic, logical, etc. While embodiments of the invention are described in which the write mask field's 870 content selects one of a number of write mask registers that contains the write mask to be used (and thus the write mask field's 870 content indirectly identifies that masking to be performed), alternative embodiments instead or additional allow the mask write field's 870 content to directly specify the masking to be performed.

Immediate field 872—its content allows for the specification of an immediate. This field is optional in the sense that is it not present in an implementation of the generic vector friendly format that does not support immediate and it is not present in instructions that do not use an immediate.

Class field 868—its content distinguishes between different classes of instructions. With reference to FIGS. 8A-B, the contents of this field select between class A and class B instructions. In FIGS. 8A-B, rounded corner squares are used to indicate a specific value is present in a field (e.g., class A 868A and class B 868B for the class field 868 respectively in FIGS. 8A-B).

Instruction Templates of Class A

In the case of the non-memory access 812 instruction templates of class A, the alpha field 852 is interpreted as an RS field 852A, whose content distinguishes which one of the different augmentation operation types are to be performed (e.g., round 852A.1 and data transform 852A.2 are respectively specified for the no memory access, round type operation 810 and the no memory access, data transform type operation 815 instruction templates), while the beta field 854 distinguishes which of the operations of the specified type is to be performed. In the no memory access 812 instruction templates, the scale field 860, the displacement field 862A, and the displacement scale filed 862B are not present.

No-Memory Access Instruction Templates—Full Round Control Type Operation

In the no memory access full round control type operation 813 instruction template, the beta field 854 is interpreted as a round control field 854A, whose content(s) provide static rounding. While in the described embodiments of the invention the round control field 854A includes a suppress all floating point exceptions (SAE) field 856 and a round operation control field 858, alternative embodiments may support may encode both these concepts into the same field or only have one or the other of these concepts/fields (e.g., may have only the round operation control field 858).

SAE field 856—its content distinguishes whether or not to disable the exception event reporting; when the SAE field's 856 content indicates suppression is enabled, a given instruction does not report any kind of floating-point exception flag and does not raise any floating point exception handler.

Round operation control field 858—its content distinguishes which one of a group of rounding operations to perform (e.g., Round-up, Round-down, Round-towards-zero and Round-to-nearest). Thus, the round operation control field 858 allows for the changing of the rounding mode on a per instruction basis. In one embodiment of the invention where a processor includes a control register for specifying rounding modes, the round operation control field's 850 content overrides that register value.

No Memory Access Instruction Templates—Data Transform Type Operation

In the no memory access data transform type operation 815 instruction template, the beta field 854 is interpreted as a data transform field 854B, whose content distinguishes which one of a number of data transforms is to be performed (e.g., no data transform, swizzle, broadcast).

In the case of a memory access 820 instruction template of class A, the alpha field 852 is interpreted as an eviction hint field 852B, whose content distinguishes which one of the eviction hints is to be used (in FIG. 8A, temporal 852B.1 and non-temporal 852B.2 are respectively specified for the memory access, temporal 825 instruction template and the memory access, non-temporal 830 instruction template), while the beta field 854 is interpreted as a data manipulation field 854C, whose content distinguishes which one of a number of data manipulation operations (also known as primitives) is to be performed (e.g., no manipulation; broadcast; up conversion of a source; and down conversion of a destination). The memory access 820 instruction templates include the scale field 860, and optionally the displacement field 862A or the displacement scale field 862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 852 is interpreted as a write mask control (Z) field 852C, whose content distinguishes whether the write masking controlled by the write mask field 870 should be a merging or a zeroing.

In the case of the no memory access 812 instruction templates of class B, part of the beta field 854 is interpreted as an RL field 857A, whose content distinguishes which one of the different augmentation operation types are to be performed (e.g., round 857A.1 and vector length (VSIZE) 857A.2 are respectively specified for the no memory access, write mask control, partial round control type operation 814 instruction template and the no memory access, write mask control, VSIZE type operation 817 instruction template), while the rest of the beta field 854 distinguishes which of the operations of the specified type is to be performed. In the no memory access 812 instruction templates, the scale field 860, the displacement field 862A, and the displacement scale filed 862B are not present.

In the no memory access, write mask control, partial round control type operation 810 instruction template, the rest of the beta field 854 is interpreted as a round operation field 859A and exception event reporting is disabled (a given instruction does not report any kind of floating-point exception flag and does not raise any floating point exception handler).

Round operation control field 859A—just as round operation control field 858, its content distinguishes which one of a group of rounding operations to perform (e.g., Round-up, Round-down, Round-towards-zero and Round-to-nearest). Thus, the round operation control field 859A allows for the changing of the rounding mode on a per instruction basis. In one embodiment of the invention where a processor includes a control register for specifying rounding modes, the round operation control field's 850 content overrides that register value.

In the no memory access, write mask control, VSIZE type operation 817 instruction template, the rest of the beta field 854 is interpreted as a vector length field 859B, whose content distinguishes which one of a number of data vector lengths is to be performed on (e.g., 128, 256, or 512 byte).

In the case of a memory access 820 instruction template of class B, part of the beta field 854 is interpreted as a broadcast field 857B, whose content distinguishes whether or not the broadcast type data manipulation operation is to be performed, while the rest of the beta field 854 is interpreted the vector length field 859B. The memory access 820 instruction templates include the scale field 860, and optionally the displacement field 862A or the displacement scale field 862B.

With regard to the generic vector friendly instruction format 811, a full opcode field 874 is shown including the format field 840, the base operation field 842, and the data element width field 864. While one embodiment is shown where the full opcode field 874 includes all of these fields, the full opcode field 874 includes less than all of these fields in embodiments that do not support all of them. The full opcode field 874 provides the operation code (opcode).

The augmentation operation field 850, the data element width field 864, and the write mask field 870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 9A is a block diagram illustrating an exemplary specific vector friendly instruction format according to embodiments of the invention. FIG. 9A shows a specific vector friendly instruction format 900 that is specific in the sense that it specifies the location, size, interpretation, and order of the fields, as well as values for some of those fields. The specific vector friendly instruction format 900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 8 into which the fields from FIG. 9A map are illustrated.

It should be understood that, although embodiments of the invention are described with reference to the specific vector friendly instruction format 900 in the context of the generic vector friendly instruction format 811 for illustrative purposes, the invention is not limited to the specific vector friendly instruction format 900 except where claimed. For example, the generic vector friendly instruction format 811 contemplates a variety of possible sizes for the various fields, while the specific vector friendly instruction format 900 is shown as having fields of specific sizes. By way of specific example, while the data element width field 864 is illustrated as a one bit field in the specific vector friendly instruction format 900, the invention is not so limited (that is, the generic vector friendly instruction format 811 contemplates other sizes of the data element width field 864).

The generic vector friendly instruction format 811 includes the following fields listed below in the order illustrated in FIG. 9A.

EVEX Prefix (Bytes 0-3) 902—is encoded in a four-byte form.

Format Field 840 (EVEX Byte 0, bits [7:0])—the first byte (EVEX Byte 0) is the format field 840 and it contains 0x62 (the unique value used for distinguishing the vector friendly instruction format in one embodiment of the invention).

The second-fourth bytes (EVEX Bytes 1-3) include a number of bit fields providing specific capability.

REX field 905 (EVEX Byte 1, bits [7-5])—consists of a EVEX.R bit field (EVEX Byte 1, bit [7]-R), EVEX.X bit field (EVEX byte 1, bit [6]-X), and 857BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' 910A—this is the first part of the REX' field 910 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD RIM field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 915 (EVEX byte 1, bits [3:0]-mmmm)—its content encodes an implied leading opcode byte 0F, 0F 38, or 0F 3).

Data element width field 864 (EVEX byte 2, bit [7]-W)—is represented by the notation EVEX.W. EVEX.W is used to define the granularity (size) of the datatype (either 32-bit data elements or 64-bit data elements).

EVEX.vvvv 920 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 920 encodes the 4 low-order bits of the first source register specifier stored in inverted (1s complement) form. Depending on the instruction, an extra different EVEX bit field is used to extend the specifier size to 32 registers.

EVEX.U 868 Class field (EVEX byte 2, bit [2]-U)—If EVEX.U=0, it indicates class A or EVEX.U0; if EVEX.U=1, it indicates class B or EVEX.U1.

Prefix encoding field 925 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use an SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 852 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 854 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' 910B—this is the remainder of the REX' field 910 and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 870 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 930 (Byte 4) is also known as the opcode byte. Part of the opcode is specified in this field.

MOD R/M Field 940 (Byte 5) includes MOD field 942, Reg field 944, and R/M field 946. As previously described, the MOD field's 942 content distinguishes between memory access and non-memory access operations. The role of Reg field 944 can be summarized to two situations: encoding either the destination register operand or a source register operand or be treated as an opcode extension and not used to encode any instruction operand. The role of R/M field 946 may include the following: encoding the instruction operand that references a memory address or encoding either the destination register operand or a source register operand.

Scale, Index, Base (SIB) Byte (Byte 6)—As previously described, the scale field's 850 content is used for memory address generation. SIB.xxx 954 and SIB.bbb 956—the contents of these fields have been previously referred to with regard to the register indexes Xxxx and Bbbb.

Displacement field 862A (Bytes 7-10)—when MOD field 942 contains 10, bytes 7-10 are the displacement field 862A, and it works the same as the legacy 32-bit displacement (disp32) and works at byte granularity.

Displacement factor field 862B (Byte 7)—when MOD field 942 contains 01, byte 7 is the displacement factor field 862B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 862B is a reinterpretation of disp8; when using displacement factor field 862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 862B substitutes the legacy x86 instruction set 8-bit displacement. Thus, the displacement factor field 862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 872 operates as previously described.

Full Opcode Field

FIG. 9B is a block diagram illustrating the fields of the specific vector friendly instruction format 900 that make up the full opcode field 874 according to one embodiment of the invention. Specifically, the full opcode field 874 includes the format field 840, the base operation field 842, and the data element width (W) field 864. The base operation field 842 includes the prefix encoding field 925, the opcode map field 915, and the real opcode field 930.

Register Index Field

FIG. 9C is a block diagram illustrating the fields of the specific vector friendly instruction format 900 that make up the register index field 844 according to one embodiment of the invention. Specifically, the register index field 844 includes the REX field 905, the REX' field 910, the MODR/M.reg field 944, the MODR/M.r/m field 946, the VVVV field 920, xxx field 954, and the bbb field 956.

Augmentation Operation Field

Figure 9D:
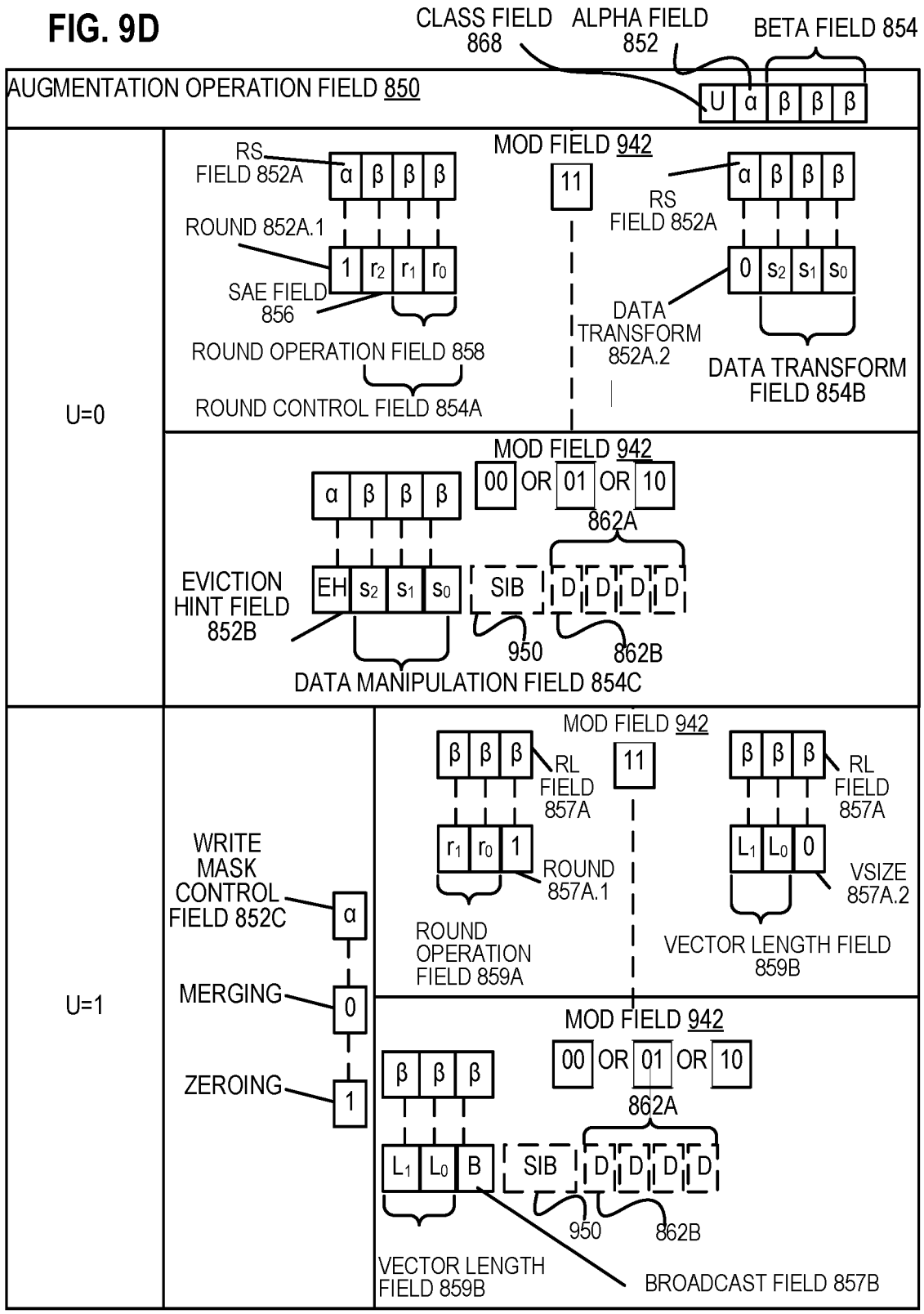
FIG. 9D is a block diagram illustrating the fields of the specific vector friendly instruction format that make up the augmentation operation field according to one embodiment of the invention.

FIG. 9D is a block diagram illustrating the fields of the specific vector friendly instruction format 900 that make up the augmentation operation field 850 according to one embodiment of the invention. When the class (U) field 868 contains 0, it signifies EVEX.U0 (class A 868A); when it contains 1, it signifies EVEX.U1 (class B 868B). When U=0 and the MOD field 942 contains 11 (signifying a no memory access operation), the alpha field 852 (EVEX byte 3, bit [7]-EH) is interpreted as the rs field 852A. When the rs field 852A contains a 1 (round 852A.1), the beta field 854 (EVEX byte 3, bits [6:4]-SSS) is interpreted as the round control field 854A. The round control field 854A includes a one bit SAE field 856 and a two bit round operation field 858. When the rs field 852A contains a 0 (data transform 852A.2), the beta field 854 (EVEX byte 3, bits [6:4]-SSS) is interpreted as a three bit data transform field 854B. When U=0 and the MOD field 942 contains 00, 01, or 10 (signifying a memory access operation), the alpha field 852 (EVEX byte 3, bit [7]-EH) is interpreted as the eviction hint (EH) field 852B and the beta field 854 (EVEX byte 3, bits [6:4]-SSS) is interpreted as a three bit data manipulation field 854C.

When U=1, the alpha field 852 (EVEX byte 3, bit [7]-EH) is interpreted as the write mask control (Z) field 852C. When U=1 and the MOD field 942 contains 11 (signifying a no memory access operation), part of the beta field 854 (EVEX byte 3, bit [4]-$S_0$) is interpreted as the RL field 857A; when it contains a 1 (round 857A.1) the rest of the beta field 854 (EVEX byte 3, bit [6-5]-$S_{2-1}$) is interpreted as the round operation field 859A, while when the RL field 857A contains a 0 (VSIZE 857.A2) the rest of the beta field 854 (EVEX byte 3, bit [6-5]-$S_{2-1}$) is interpreted as the vector length field 859B (EVEX byte 3, bit [6-5]-$L_{1-0}$). When U=1 and the MOD field 942 contains 00, 01, or 10 (signifying a memory access operation), the beta field 854 (EVEX byte 3, bits [6:4]-SSS) is interpreted as the vector length field 859B (EVEX byte 3, bit [6-5]-$L_{1-0}$) and the broadcast field 857B (EVEX byte 3, bit [4]-B).

Exemplary Register Architecture

Figure 10:
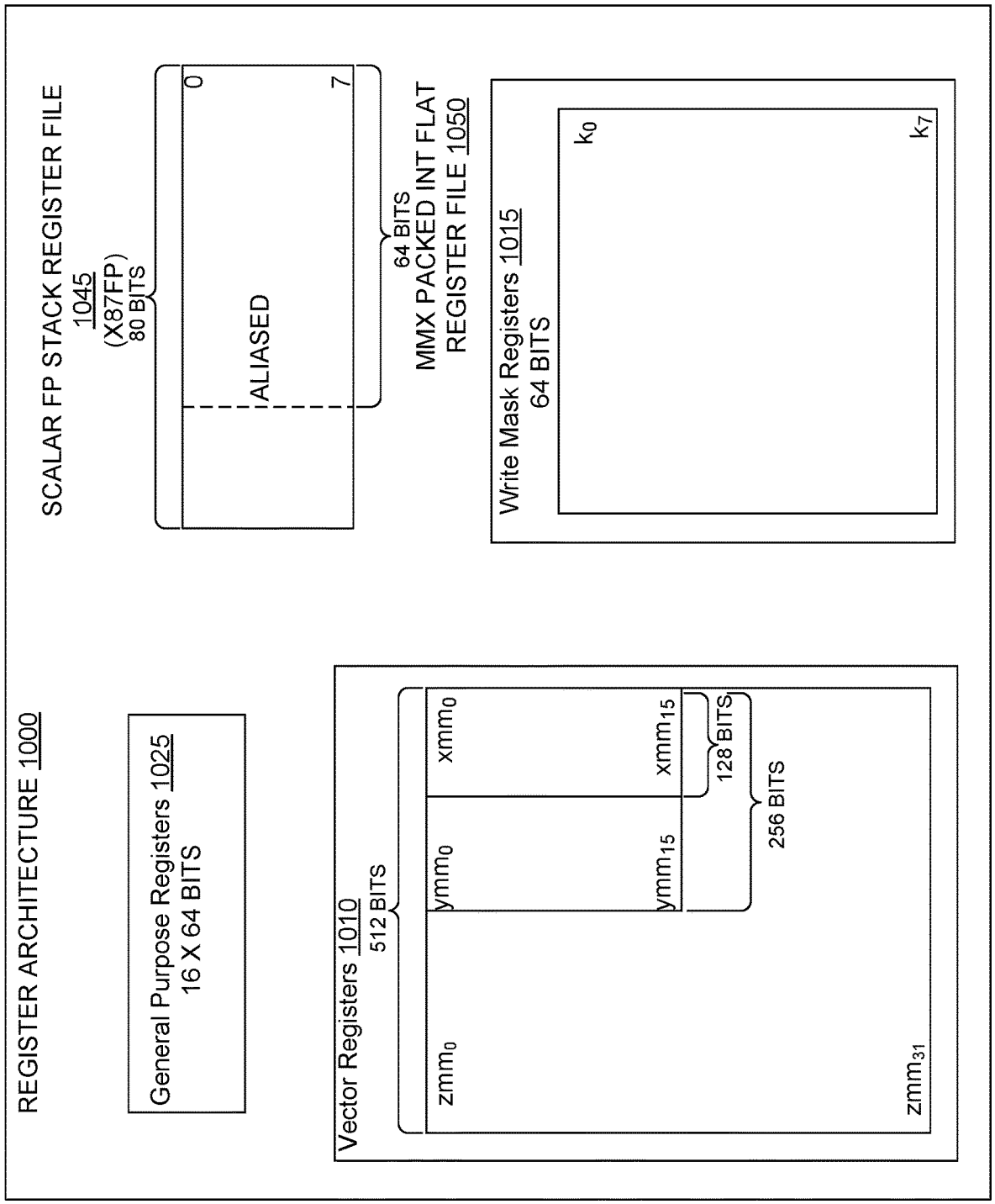
FIG. 10 is a block diagram of a register architecture according to one embodiment of the invention.

FIG. 10 is a block diagram of a register architecture 1000 according to one embodiment of the invention. In the embodiment illustrated, there are 32 vector registers 1010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 900 operates on these overlaid register file as illustrated in the below tables.

| Adjustable Vector Length | Class | Operations | Registers |
|---|---|---|---|
| Instruction Templates that do not include the vector length field 859B | A (FIG. 8A; U = 0) | 810, 815, 825, 830 | zmm registers (the vector length is 64 byte) |
| | B (FIG. 8B; U = 1) | 812 | zmm registers (the vector length is 64 byte) |
| Instruction templates that do include the vector length field 859B | B (FIG. 8B; U = 1) | 817, 827 | zmm, ymm, or xmm registers (the vector length is 64 byte, 32 byte, or 16 byte) depending on the vector length field 859B |

In other words, the vector length field 859B selects between a maximum length and one or more other shorter lengths, where each such shorter length is half the length of the preceding length; and instructions templates without the vector length field 859B operate on the maximum vector length. Further, in one embodiment, the class B instruction templates of the specific vector friendly instruction format 900 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1015—in the embodiment illustrated, there are 8 write mask registers (k0 through k7), each 64 bits in size. In an alternate embodiment, the write mask registers 1015 are 16 bits in size. As previously described, in one embodiment of the invention, the vector mask register k0 cannot be used as a write mask; when the encoding that would normally indicate k0 is used for a write mask, it selects a hardwired write mask of 0xFF, effectively disabling write masking for that instruction.

General-purpose registers 1025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1045, on which is aliased the MMX packed integer flat register file 1050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing;

and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-of-order issue/execution architecture core to be included in a processor according to embodiments of the invention. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 12B:
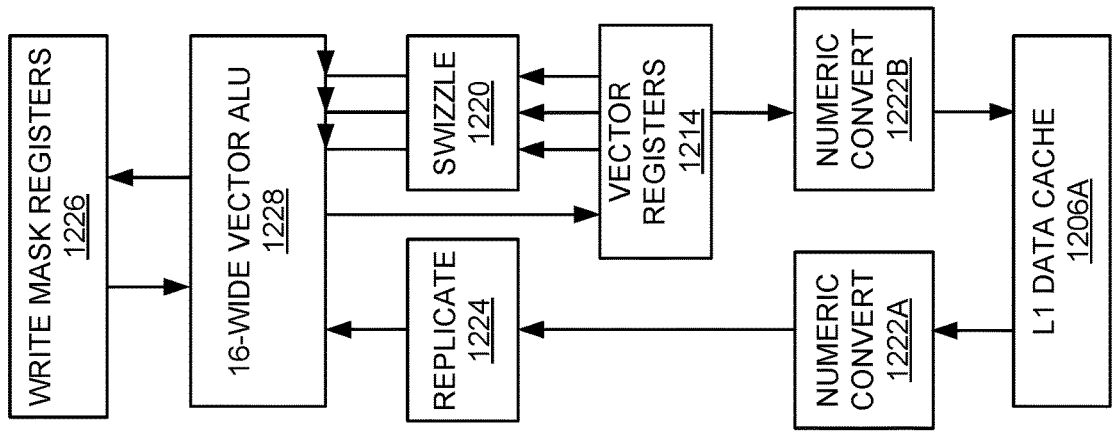
FIGS. 12A-B illustrate a block diagram of a more specific exemplary in-order core architecture, which core would be one of several logic blocks (including other cores of the same type and/or different types) in a chip.
Figure 12A:
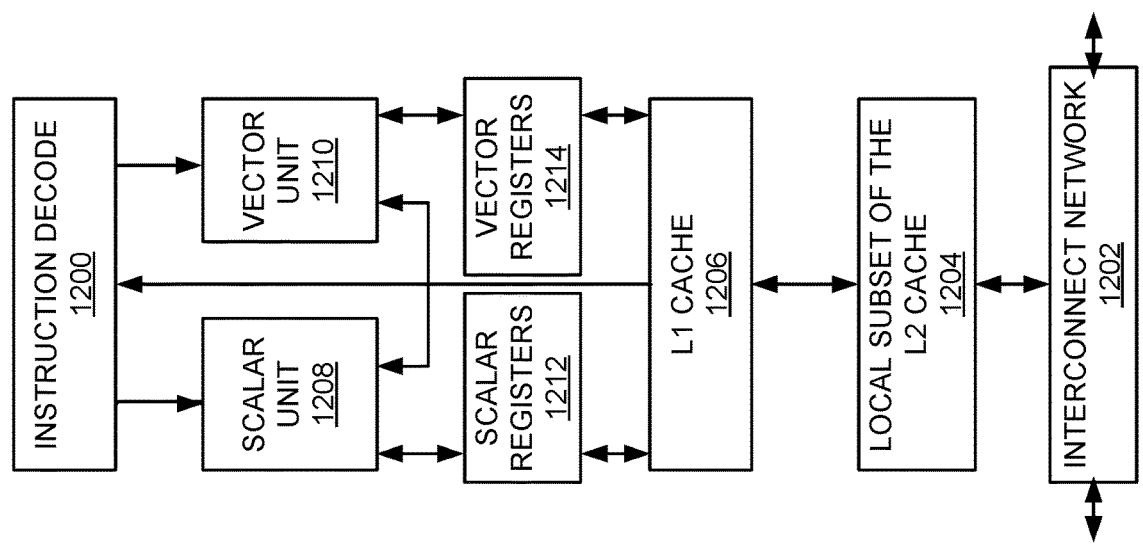

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to embodiments of the invention. In one embodiment, an instruction decoder 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the invention may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the invention. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Figure 13:
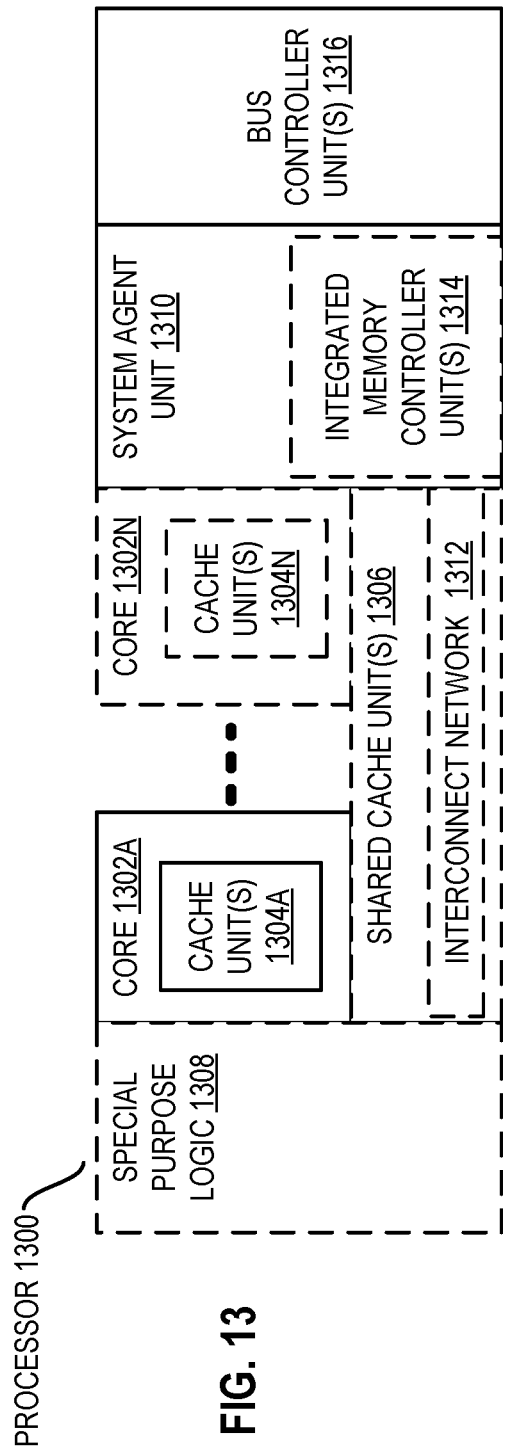
FIG. 13 is a block diagram of a processor that may have more than one core, may have an integrated memory controller, and may have integrated graphics according to embodiments of the invention.

FIG. 13 is a block diagram of a processor 1300 that may have more than one core, may have an integrated memory controller, and may have integrated graphics according to embodiments of the invention. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308 (integrated graphics logic 1308 is an example of and is also referred to herein as special purpose logic), the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multithreading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
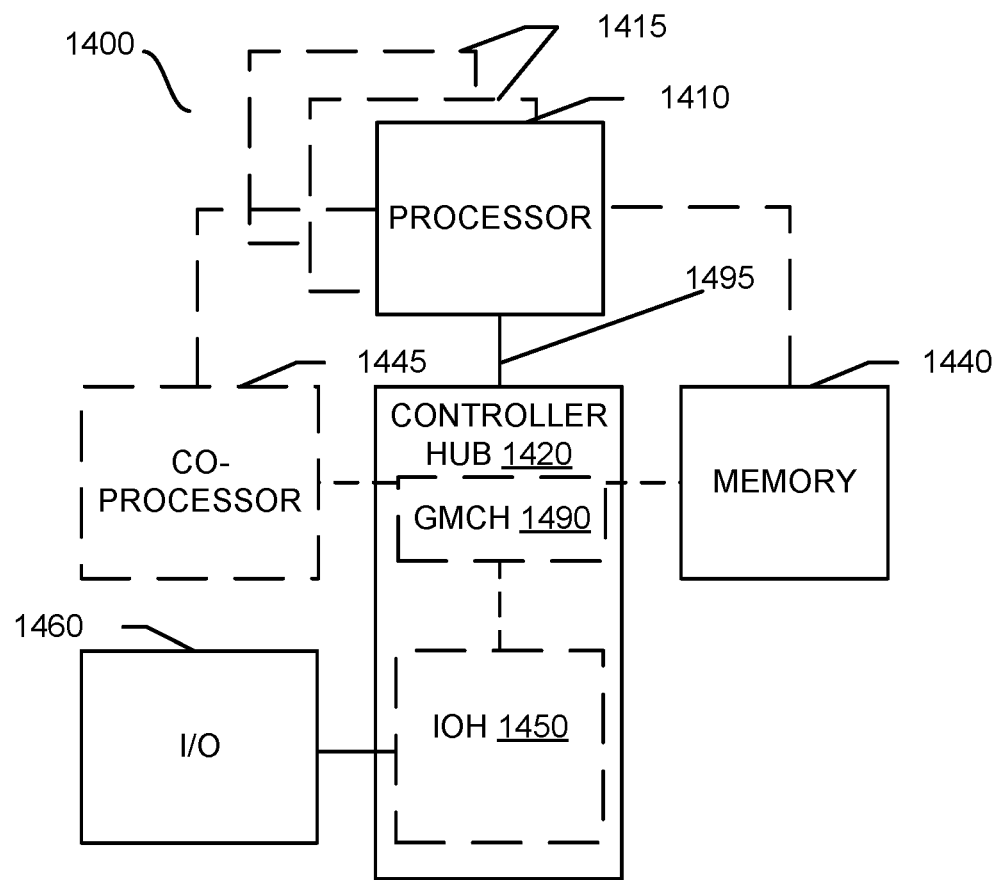
FIGS. 14-17 are block diagrams of exemplary computer architectures.

Referring now to FIG. 14, shown is a block diagram of a system 1400 in accordance with one embodiment of the present invention. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor(s) 1445 accept and execute the received coprocessor instructions.

Figure 15:
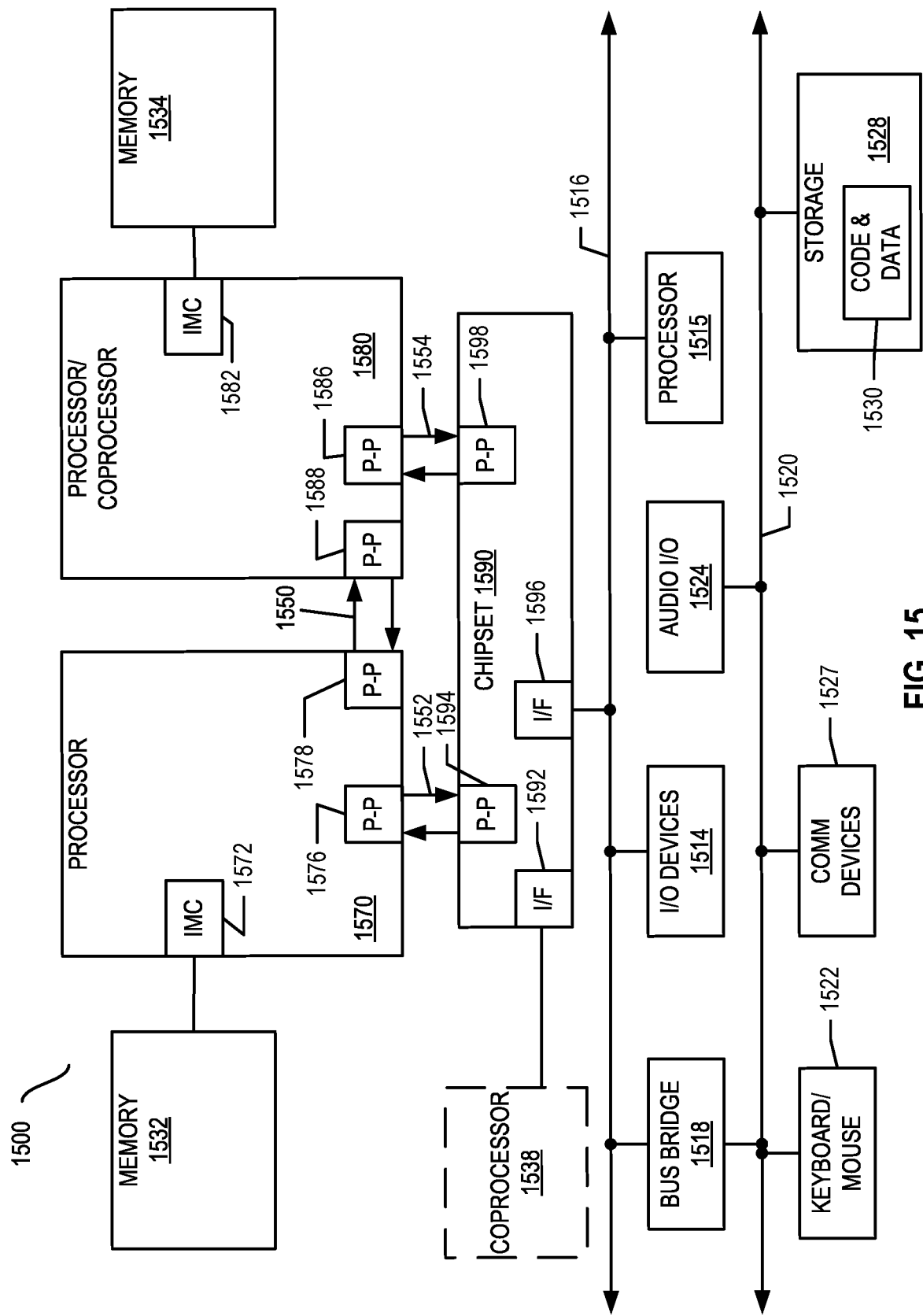

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the invention, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1592. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
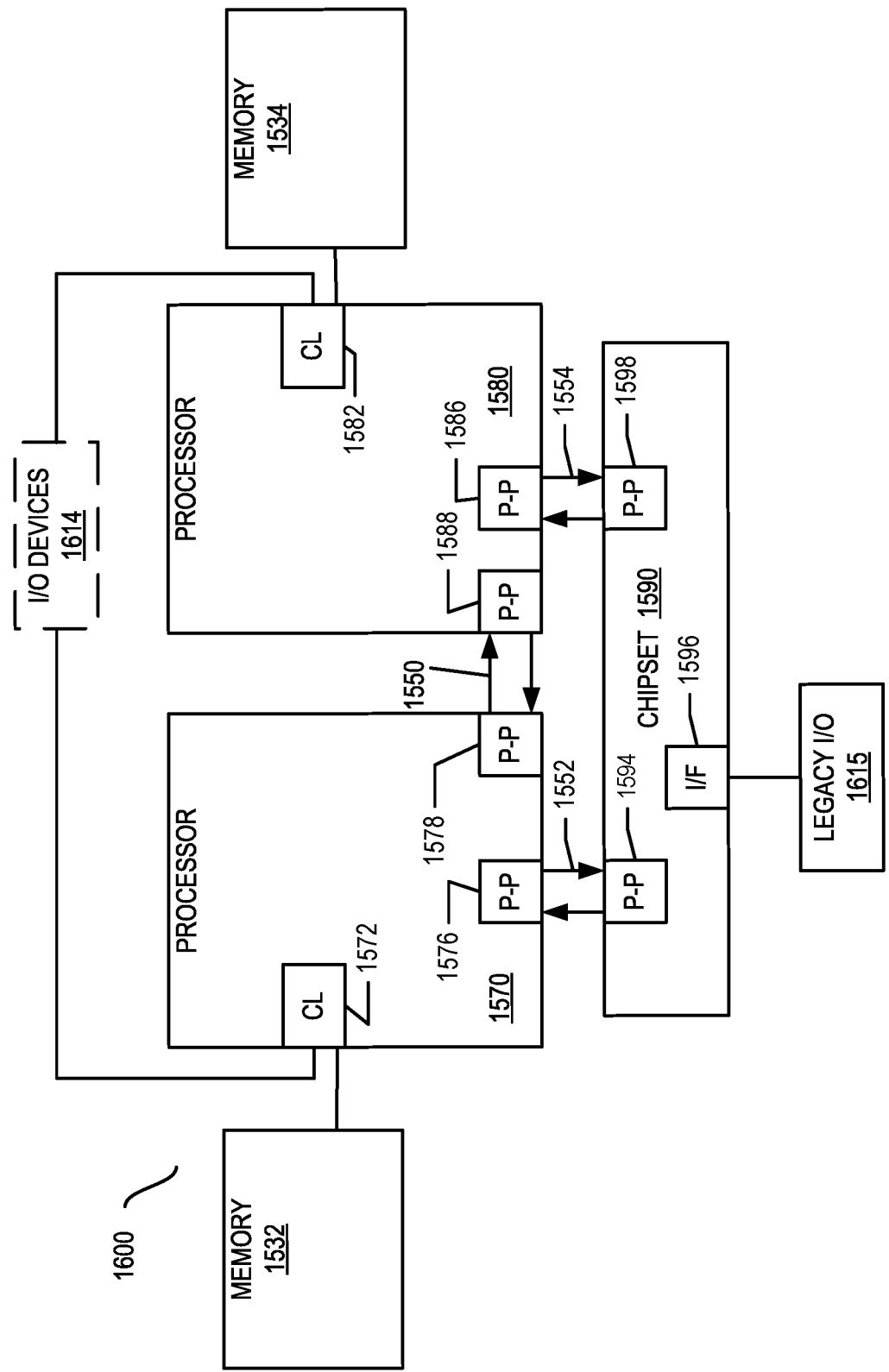

Referring now to FIG. 16, shown is a block diagram of a second more specific exemplary system 1600 in accordance with an embodiment of the present invention. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
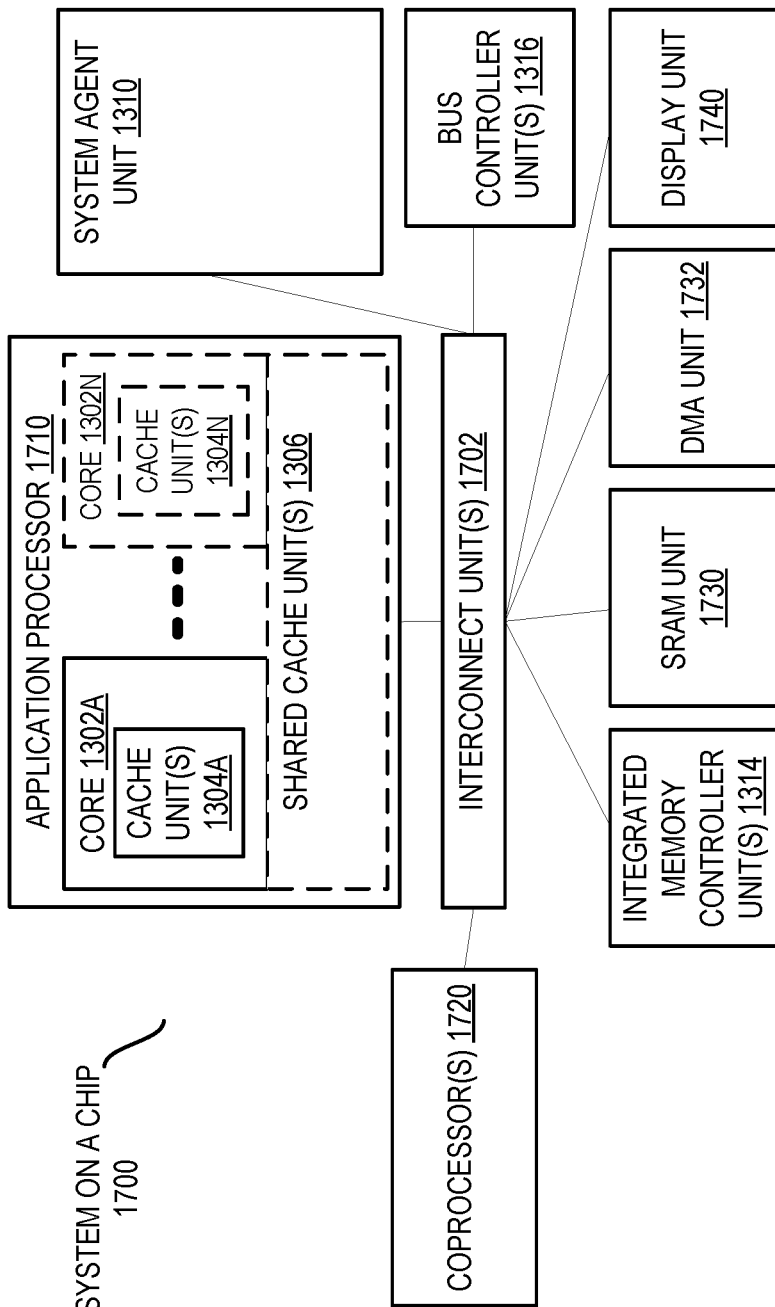

Referring now to FIG. 17, shown is a block diagram of a SoC 1700 in accordance with an embodiment of the present invention. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 1302A-N, which include cache units 1304A-N, and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
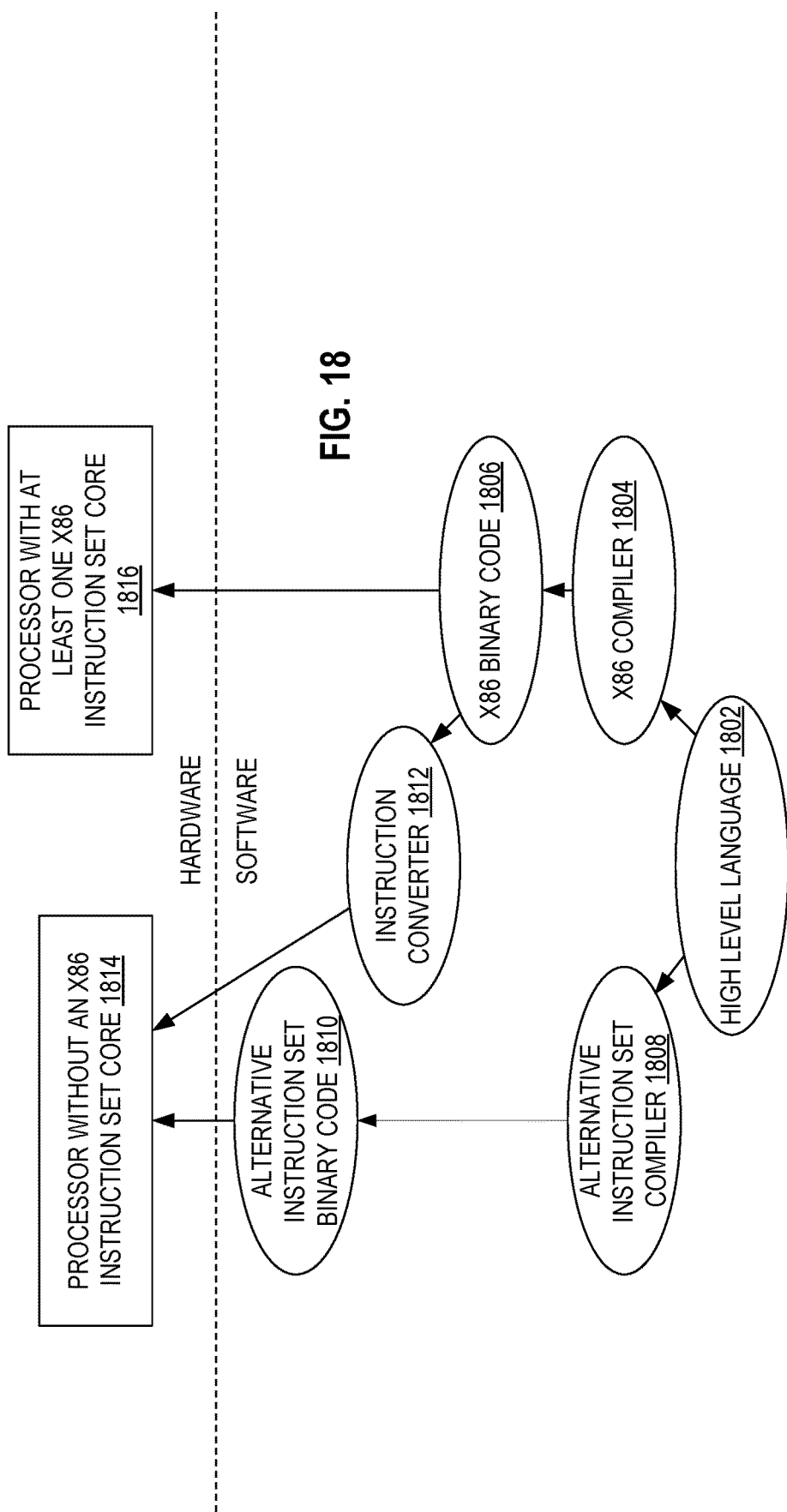
FIG. 18 is a block diagram contrasting the use of a software instruction converter to convert binary instructions in a source instruction set to binary instructions in a target instruction set according to embodiments of the invention.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

Further Examples

Example 1 provides an exemplary processor comprising: fetch and decode circuitry to fetch and decode a variable format, variable sparsity matrix multiplication (VFVSMM) instruction having fields to specify locations where each of A, B, and C matrices having (M×K), (K×N), and (M×N) elements, respectively, is stored, and execution circuitry, operating in a dense-dense mode, in response to the decoded VFVSMM instruction, to route each row of the specified A matrix, staggering subsequent rows, into a corresponding row of a processing array having (M×N) processing units, and route each column of the specified B matrix, staggering subsequent columns, into a corresponding column of the processing array, and wherein each of the (M×N) processing units is to generate K products of matching A-matrix and B-matrix elements received from the specified A and B matrices, respectively, a match to exist when the B-Matrix element has the same row address as a column address of the A-matrix element, and to accumulate each generated product with a corresponding element of the specified C-matrix having a same relative position as a position of the processing unit in the processing array.

Example 2 includes the substance of the exemplary processor of Example 1, wherein the execution circuitry is to route each row of the specified A matrix and each column of the specified B matrix at a rate of one element per clock cycle and to stagger each subsequent row and subsequent column by one clock cycle, and wherein each of the (M×N) processing units is to infer column and row addresses of each received A-matrix and B-matrix element based on a clock cycle and on a relative position of the processing unit within the processing array.

Example 3 includes the substance of the exemplary processor of Example 1, wherein the specified B matrix is to comprise only non-zero elements of a sparse matrix logically comprising (K×N) elements, with each element to include a field to specify its logical row and column addresses, wherein the execution circuitry, operating in a dense-sparse mode, in response to the decoded VFVSMM instruction, is to route each row of the specified A matrix, staggering subsequent rows, into the corresponding row of the processing array, and to route each column of the specified B matrix into the corresponding column of the processing array, and wherein each of the (M×N) processing units, operating in the dense-sparse mode, is to: determine whether an address match exists between the specified logical row address of the B-matrix element and the column address of the A-matrix element, and when the match exists, generate the product, and when no match exists, hold the A-matrix element and pass the B-matrix element when the column address of the A-matrix element is larger than the specified logical row address of the B-matrix element, and, otherwise, hold the B-matrix element and pass the A-matrix element.

Example 4 includes the substance of the exemplary processor of Example 1, wherein the specified A and B matrices are sparse matrices comprising only non-zero elements of logical (M×K) and (K×N) matrices, respectively, with each element including a field to specify its logical row and column addresses, and wherein the execution circuitry, operating in a sparse-sparse mode, in response to the decoded VFVSMM instruction, is to route each row of the specified A matrix into the corresponding row of the processing array, and route each column of the specified B matrix into the corresponding column of the processing array, and wherein each of the (M×N) processing units, operating in the sparse-sparse mode, is to: determine whether a match exists between the specified logical column address of the A-matrix element and the specified logical row address of the B-matrix element, and when the match exists, generate the product, and when no match exists, hold the A-matrix element and pass the B-matrix element when the specified logical column address of the A-matrix element is larger than the specified logical row address of the B-matrix element, and, otherwise, hold the B-matrix element and pass the A-matrix element.

Example 5 includes the substance of the exemplary processor of Example 1, wherein each of the (M×N) processing units is further to, when no match exists, generate and send a hold request upstream in a direction of the data element being held, and generate and send a hold notice downstream in the direction of the data element being held.

Example 6 includes the substance of the exemplary processor of Example 1, wherein the execution circuitry, when passing a data element, is to broadcast the data element downstream to two or more processing units.

Example 7 includes the substance of the exemplary processor of Example 1, wherein the matrix multiplication instruction is further to specify a data element size of each of the data elements of the specified A, B, and C matrices, the data element size being specified either as an instruction operand or as part of an opcode.

Example 8 includes the substance of the exemplary processor of Example 1, wherein the matrix multiplication instruction is further to specify a data format of each of the data elements of the specified A, B, and C matrices, the data format being one of integer, half-precision floating point, single-precision floating point, double-precision floating point, and a custom format.

Example 9 includes the substance of the exemplary processor of Example 1, wherein the processing array is to effectively comprise (M×N) processing units by using a smaller array of processing units iteratively over a plurality of clock cycles to perform the same processing as an actual, physical array of (M×N) processing units.

Example 10 includes the substance of the exemplary processor of Example 1, wherein the processing array is to effectively comprise (M×N) processing units by cascading a plurality of smaller arrays of processing units to perform the same processing as an actual, physical array of (M×N) processing units.

Example 11 provides an exemplary method comprising: fetching and decoding, using fetch and decode circuitry, a variable format, variable sparsity matrix multiplication (VFVSMM) instruction having fields to specify locations where each of A, B, and C matrices having (M×K), (K×N), and (M×N) elements, respectively, is stored, and responding to the decoded VFVSMM instruction, using execution circuitry operating in a dense-dense mode by routing each row of the specified A matrix, staggering subsequent rows, into a corresponding row of a processing array having (M×N) processing units, and routing each column of the specified B matrix, staggering subsequent columns, into a corresponding column of the processing array, and wherein each of the (M×N) processing units is to generate K products of matching A-matrix and B-matrix elements received from the specified A and B matrices, respectively, a match to exist when the B-Matrix element has a same row address as a column address of the A-matrix element, and to accumulate each generated product with a corresponding element of the specified C-matrix having a same relative position as a position of the processing unit in the processing array.

Example 12 includes the substance of the exemplary method of Example 11, wherein the execution circuitry is to route each row of the specified A matrix and each column of the specified B matrix at a rate of one element per clock cycle and to stagger each subsequent row and subsequent column by one clock cycle, and wherein each of the (M×N) processing units is to infer column and row addresses of each received A-matrix and B-matrix element based on a clock cycle and on a relative position of the processing unit within the processing array.

Example 13 includes the substance of the exemplary method of Example 11, wherein the specified B matrix is to comprise only non-zero elements of a sparse matrix logically comprising (K×N) elements, with each element to include a field to specify its logical row and column addresses, wherein the execution circuitry, operating in a dense-sparse mode, in response to the decoded VFVSMM instruction, is to route each row of the specified A matrix, staggering subsequent rows, into the corresponding row of the processing array, and to route each column of the specified B matrix into the corresponding column of the processing array, and wherein each of the (M×N) processing units, operating in the dense-sparse mode, is to: determine whether an address match exists between the specified logical row address of the B-matrix element and the column address of the A-matrix element, and when the match exists, generate the product, and when no match exists, hold the A-matrix element and pass the B-matrix element when the inferred column address of the A-matrix element is larger than the specified logical row address of the B-matrix element, and, otherwise, hold the B-matrix element and pass the A-matrix element.

Example 14 includes the substance of the exemplary method of Example 11, wherein the specified A and B matrices are sparse matrices comprising only non-zero elements of logical (M×K) and (K×N) matrices, respectively, with each element including a field to specify its logical row and column addresses, and wherein the execution circuitry, operating in a sparse-sparse mode, in response to the decoded VFVSMM instruction, is to route each row of the specified A matrix into the corresponding row of the processing array, and route each column of the specified B matrix into the corresponding column of the processing array, and wherein each of the (M×N) processing units, operating in the sparse-sparse mode, is to: determine whether a match exists between the specified logical column address of the A-matrix element and the specified logical row address of the B-matrix element, and when the match exists, generate the product, and when no match exists, hold the A-matrix element and pass the B-matrix element when the specified logical column address of the A-matrix element is larger than the specified logical row address of the B-matrix element, and, otherwise, hold the B-matrix element and pass the A-matrix element.

Example 15 includes the substance of the exemplary method of Example 11, wherein each of the (M×N) processing units is further to, when no match exists, generate and send a hold request upstream in a direction of the data element being held, and generate and send a hold notice downstream in the direction of the data element being held.

Example 16 includes the substance of the exemplary method of Example 11, wherein the execution circuitry, when passing a data element, is to broadcast the data element downstream to two or more processing units.

Example 17 includes the substance of the exemplary method of Example 11, wherein the matrix multiplication instruction is further to specify a data element size of each of the data elements of the specified A, B, and C matrices, the data element size being specified either as an instruction operand or as part of an opcode.

Example 18 includes the substance of the exemplary method of Example 11, wherein the matrix multiplication instruction is further to specify a data format of each of the data elements of the specified A, B, and C matrices, the data format being one of integer, half-precision floating point, single-precision floating point, double-precision floating point, and a custom format.

Example 19 includes the substance of the exemplary method of Example 11, wherein the processing array is to effectively comprise (M×N) processing units by using a smaller array of processing units iteratively over a plurality of clock cycles to perform the same processing as an actual, physical array of (M×N) processing units.

Example 20 includes the substance of the exemplary method of Example 11, wherein the processing array is to effectively comprise (M×N) processing units by cascading a plurality of smaller arrays of processing units to perform the same processing as an actual, physical array of (M×N) processing units.

Example 21 provides an exemplary non-transitory machine-readable medium containing instructions that, when executed by a processor, cause the processor to respond by: fetching and decoding, using fetch and decode circuitry, a variable format, variable sparsity matrix multiplication (VFVSMM) instruction having fields to specify locations where each of A, B, and C matrices having (M×K), (K×N), and (M×N) elements, respectively, is stored, and responding to the decoded VFVSMM instruction, using execution circuitry operating in a dense-dense mode by routing each row of the specified A matrix, staggering subsequent rows, into a corresponding row of a processing array having (M×N) processing units, and routing each column of the specified B matrix, staggering subsequent columns, into a corresponding column of the processing array, and wherein each of the (M×N) processing units is to generate K products of matching A-matrix and B-matrix elements received from the specified A and B matrices, respectively, a match to exist when the B-Matrix element has the same row address as a column address of the A-matrix element, and to accumulate each generated product with a corresponding element of the specified C-matrix having a same relative position as a position of the processing unit in the processing array.

Example 22 includes the substance of the exemplary non-transitory machine-readable medium of Example 21, wherein the execution circuitry is to route each row of the specified A matrix and each column of the specified B matrix at a rate of one element per clock cycle and to stagger each subsequent row and subsequent column by one clock cycle, and wherein each of the (M×N) processing units is to infer column and row addresses of each received A-matrix and B-matrix element based on a clock cycle and on a relative position of the processing unit within the processing array.

Example 23 includes the substance of the exemplary non-transitory machine-readable medium of Example 21: wherein the specified B matrix is to comprise only non-zero elements of a sparse matrix logically comprising (K×N) elements, with each element to include a field to specify its logical row and column addresses, wherein the execution circuitry, operating in a dense-sparse mode, in response to the decoded VFVSMM instruction, is to route each row of the specified A matrix, staggering subsequent rows by one clock cycle, into the corresponding row of the processing array, and to route each column of the specified B matrix into the corresponding column of the processing array, and wherein each of the (M×N) processing units, operating in the dense-sparse mode, is to determine whether an address match exists between the specified logical row address of the B-matrix element and the column address of the A-matrix element, and when the match exists, generate the product, and when no match exists, hold the A-matrix element and pass the B-matrix element when the column address of the A-matrix element is larger than the specified logical row address of the B-matrix element, and, otherwise, hold the B-matrix element and pass the A-matrix element.

Example 24 includes the substance of the exemplary non-transitory machine-readable medium of Example 21, wherein the specified A and B matrices are sparse matrices comprising only non-zero elements of logical (M×K) and (K×N) matrices, respectively, with each element including a field to specify its logical row and column addresses, and wherein the execution circuitry, operating in a sparse-sparse mode, in response to the decoded VFVSMM instruction, is to route each row of the specified A matrix into the corresponding row of the processing array, and route each column of the specified B matrix into the corresponding column of the processing array, and wherein each of the (M×N) processing units, operating in the sparse-sparse mode, is to: determine whether a match exists between the specified logical column address of the A-matrix element and the specified logical row address of the B-matrix element, and when the match exists, generate the product, and when no match exists, hold the A-matrix element and pass the B-matrix element when the specified logical column address of the A-matrix element is larger than the specified logical row address of the B-matrix element, and, otherwise, hold the B-matrix element and pass the A-matrix element.

Example 25 includes the substance of the exemplary non-transitory machine-readable medium of Example 21, wherein each of the (M×N) processing units is further to, when no match exists, generate and send a hold request upstream in a direction of the data element being held, and generate and send a hold notice downstream in the direction of the data element being held.

What is claimed is:

1. A processor comprising:
   fetch and decode circuitry to fetch and decode a variable format, variable sparsity matrix multiplication (VFVSMM) instruction having fields to specify locations where each of A, B, and C matrices having (M×K), (K×N), and (M×N) elements, respectively, is stored; and
   execution circuitry, operating in a dense-dense mode, in response to the decoded VFVSMM instruction, to route each row of the specified A matrix, staggering subsequent rows, into a corresponding row of a processing array having (M×N) processing units, and route each column of the specified B matrix, staggering subsequent columns, into a corresponding column of the processing array, and
   wherein each of the (M×N) processing units is to generate K products of matching A-matrix and B-matrix elements received from the specified A and B matrices, respectively, a match to exist when the B-Matrix element has the same row address as a column address of the A-matrix element, and to accumulate each generated product with a corresponding element of the specified C-matrix having a same relative position as a position of the processing unit in the processing array.

2. The processor of claim 1, wherein the execution circuitry is to route each row of the specified A matrix and each column of the specified B matrix at a rate of one element per clock cycle and to stagger each subsequent row and subsequent column by one clock cycle, and wherein each of the (M×N) processing units is to infer column and row addresses of each received A-matrix and B-matrix element based on a clock cycle and on a relative position of the processing unit within the processing array.

3. The processor of claim 1, wherein the specified B matrix is to comprise only non-zero elements of a sparse matrix logically comprising (K×N) elements, with each element to include a field to specify its logical row and column addresses;
   wherein the execution circuitry, operating in a dense-sparse mode, in response to the decoded VFVSMM instruction, is to route each row of the specified A matrix, staggering subsequent rows, into the corresponding row of the processing array, and to route each column of the specified B matrix into the corresponding column of the processing array, and wherein each of the (M×N) processing units, operating in the dense-sparse mode, is to:
  determine whether an address match exists between the specified logical row address of the B-matrix element and the column address of the A-matrix element; and
  when the match exists, generate the product, and when no match exists, hold the A-matrix element and pass the B-matrix element when the column address of the A-matrix element is larger than the specified logical row address of the B-matrix element, and, otherwise, hold the B-matrix element and pass the A-matrix element.

4. The processor of claim 1;
wherein the specified A and B matrices are sparse matrices comprising only non-zero elements of logical (M×K) and (K×N) matrices, respectively, with each element including a field to specify its logical row and column addresses; and
wherein the execution circuitry, operating in a sparse-sparse mode, in response to the decoded VFVSMM instruction, is to route each row of the specified A matrix into the corresponding row of the processing array, and route each column of the specified B matrix into the corresponding column of the processing array, and
wherein each of the (M×N) processing units, operating in the sparse-sparse mode, is to:
  determine whether a match exists between the specified logical column address of the A-matrix element and the specified logical row address of the B-matrix element; and
  when the match exists, generate the product, and when no match exists, hold the A-matrix element and pass the B-matrix element when the specified logical column address of the A-matrix element is larger than the specified logical row address of the B-matrix element, and, otherwise, hold the B-matrix element and pass the A-matrix element.

5. The processor of claim 1, wherein each of the (M×N) processing units is further to, when no match exists, generate and send a hold request upstream in a direction of the data element being held, and generate and send a hold notice downstream in the direction of the data element being held.

6. The processor of claim 1, wherein the execution circuitry, when passing a data element, is to broadcast the data element downstream to two or more processing units.

7. The processor of claim 1, wherein the matrix multiplication instruction is further to specify a data element size of each of the data elements of the specified A, B, and C matrices, the data element size being specified either as an instruction operand or as part of an opcode.

8. The processor of claim 1, wherein the matrix multiplication instruction is further to specify a data format of each of the data elements of the specified A, B, and C matrices, the data format being one of integer, half-precision floating point, single-precision floating point, double-precision floating point, and a custom format.

9. The processor of claim 1, wherein the processing array is to effectively comprise (M×N) processing units by using a smaller array of processing units iteratively over a plurality of clock cycles to perform the same processing as an actual, physical array of (M×N) processing units.

10. The processor of claim 1, wherein the processing array is to effectively comprise (M×N) processing units by cascading a plurality of smaller arrays of processing units to perform the same processing as an actual, physical array of (M×N) processing units.

11. A method comprising:
fetching and decoding, using fetch and decode circuitry, a variable format, variable sparsity matrix multiplication (VFVSMM) instruction having fields to specify locations where each of A, B, and C matrices having (M×K), (K×N), and (M×N) elements, respectively, is stored, and
responding to the decoded VFVSMM instruction, using execution circuitry operating in a dense-dense mode by routing each row of the specified A matrix, staggering subsequent rows, into a corresponding row of a processing array having (M×N) processing units, and routing each column of the specified B matrix, staggering subsequent columns, into a corresponding column of the processing array, and
wherein each of the (M×N) processing units is to generate K products of matching A-matrix and B-matrix elements received from the specified A and B matrices, respectively, a match to exist when the B-Matrix element has a same row address as a column address of the A-matrix element, and to accumulate each generated product with a corresponding element of the specified C-matrix having a same relative position as a position of the processing unit in the processing array.

12. The method of claim 11, wherein the execution circuitry is to route each row of the specified A matrix and each column of the specified B matrix at a rate of one element per clock cycle and to stagger each subsequent row and subsequent column by one clock cycle, and wherein each of the (M×N) processing units is to infer column and row addresses of each received A-matrix and B-matrix element based on a clock cycle and on a relative position of the processing unit within the processing array.

13. The method of claim 11;
wherein the specified B matrix is to comprise only non-zero elements of a sparse matrix logically comprising (K×N) elements, with each element to include a field to specify its logical row and column addresses;
wherein the execution circuitry, operating in a dense-sparse mode, in response to the decoded VFVSMM instruction, is to route each row of the specified A matrix, staggering subsequent rows, into the corresponding row of the processing array, and to route each column of the specified B matrix into the corresponding column of the processing array, and
wherein each of the (M×N) processing units, operating in the dense-sparse mode, is to:
  determine whether an address match exists between the specified logical row address of the B-matrix element and the column address of the A-matrix element; and
  when the match exists, generate the product, and when no match exists, hold the A-matrix element and pass the B-matrix element when the inferred column address of the A-matrix element is larger than the specified logical row address of the B-matrix element, and, otherwise, hold the B-matrix element and pass the A-matrix element.

14. The method of claim 11;
wherein the specified A and B matrices are sparse matrices comprising only non-zero elements of logical (M×K) and (K×N) matrices, respectively, with each element including a field to specify its logical row and column addresses; and wherein the execution circuitry, operating in a sparse-sparse mode, in response to the decoded VFVSMM instruction, is to route each row of the specified A matrix into the corresponding row of the processing array, and route each column of the specified B matrix into the corresponding column of the processing array, and wherein each of the (M×N) processing units, operating in the sparse-sparse mode, is to:
  determine whether a match exists between the specified logical column address of the A-matrix element and the specified logical row address of the B-matrix element; and
  when the match exists, generate the product, and when no match exists, hold the A-matrix element and pass the B-matrix element when the specified logical column address of the A-matrix element is larger than the specified logical row address of the B-matrix element, and, otherwise, hold the B-matrix element and pass the A-matrix element.

15. The method of claim 11, wherein each of the (M×N) processing units is further to, when no match exists, generate and send a hold request upstream in a direction of the data element being held, and generate and send a hold notice downstream in the direction of the data element being held.

16. The method of claim 11, wherein the execution circuitry, when passing a data element, is to broadcast the data element downstream to two or more processing units.

17. The method of claim 11, wherein the matrix multiplication instruction is further to specify a data element size of each of the data elements of the specified A, B, and C matrices, the data element size being specified either as an instruction operand or as part of an opcode.

18. The method of claim 11, wherein the matrix multiplication instruction is further to specify a data format of each of the data elements of the specified A, B, and C matrices, the data format being one of integer, half-precision floating point, single-precision floating point, double-precision floating point, and a custom format.

19. The method of claim 11, wherein the processing array is to effectively comprise (M×N) processing units by using a smaller array of processing units iteratively over a plurality of clock cycles to perform the same processing as an actual, physical array of (M×N) processing units.

20. The method of claim 11, wherein the processing array is to effectively comprise (M×N) processing units by cascading a plurality of smaller arrays of processing units to perform the same processing as an actual, physical array of (M×N) processing units.

21. A non-transitory machine-readable medium containing instructions that, when executed by a processor, cause the processor to respond by:
  fetching and decoding, using fetch and decode circuitry, a variable format, variable sparsity matrix multiplication (VFVSMM) instruction having fields to specify locations where each of A, B, and C matrices having (M×K), (K×N), and (M×N) elements, respectively, is stored; and
  responding to the decoded VFVSMM instruction, using execution circuitry operating in a dense-dense mode by routing each row of the specified A matrix, staggering subsequent rows, into a corresponding row of a processing array having (M×N) processing units, and routing each column of the specified B matrix, staggering subsequent columns, into a corresponding column of the processing array, and
  wherein each of the (M×N) processing units is to generate K products of matching A-matrix and B-matrix elements received from the specified A and B matrices, respectively, a match to exist when the B-Matrix element has the same row address as a column address of the A-matrix element, and to accumulate each generated product with a corresponding element of the specified C-matrix having a same relative position as a position of the processing unit in the processing array.

22. The non-transitory machine-readable medium of claim 21, wherein the execution circuitry is to route each row of the specified A matrix and each column of the specified B matrix at a rate of one element per clock cycle and to stagger each subsequent row and subsequent column by one clock cycle, and wherein each of the (M×N) processing units is to infer column and row addresses of each received A-matrix and B-matrix element based on a clock cycle and on a relative position of the processing unit within the processing array.

23. The non-transitory machine-readable medium of claim 21:
  wherein the specified B matrix is to comprise only non-zero elements of a sparse matrix logically comprising (K×N) elements, with each element to include a field to specify its logical row and column addresses;
  wherein the execution circuitry, operating in a dense-sparse mode, in response to the decoded VFVSMM instruction, is to route each row of the specified A matrix, staggering subsequent rows by one clock cycle, into the corresponding row of the processing array, and to route each column of the specified B matrix into the corresponding column of the processing array, and
  wherein each of the (M×N) processing units, operating in the dense-sparse mode, is to determine whether an address match exists between the specified logical row address of the B-matrix element and the column address of the A-matrix element, and when the match exists, generate the product, and when no match exists, hold the A-matrix element and pass the B-matrix element when the column address of the A-matrix element is larger than the specified logical row address of the B-matrix element, and, otherwise, hold the B-matrix element and pass the A-matrix element.

24. The non-transitory machine-readable medium of claim 21;
  wherein the specified A and B matrices are sparse matrices comprising only non-zero elements of logical (M×K) and (K×N) matrices, respectively, with each element including a field to specify its logical row and column addresses; and
  wherein the execution circuitry, operating in a sparse-sparse mode, in response to the decoded VFVSMM instruction, is to route each row of the specified A matrix into the corresponding row of the processing array, and route each column of the specified B matrix into the corresponding column of the processing array, and
  wherein each of the (M×N) processing units, operating in the sparse-sparse mode, is to:
    determine whether a match exists between the specified logical column address of the A-matrix element and the specified logical row address of the B-matrix element; and
    when the match exists, generate the product, and when no match exists, hold the A-matrix element and pass the B-matrix element when the specified logical column address of the A-matrix element is larger than the specified logical row address of the B-matrix element, and, otherwise, hold the B-matrix element and pass the A-matrix element.

25. The non-transitory machine-readable medium of claim 21, wherein each of the (M×N) processing units is further to, when no match exists, generate and send a hold request upstream in a direction of the data element being held, and generate and send a hold notice downstream in the direction of the data element being held.

* * * * *